(12) United States Patent
Shin et al.

(10) Patent No.: US 12,372,845 B2
(45) Date of Patent: Jul. 29, 2025

(54) OPTICAL PATH CONTROL MEMBER AND DISPLAY DEVICE COMPRISING SAME

(71) Applicant: LG INNOTEK CO., LTD., Seoul (KR)

(72) Inventors: Jun Sik Shin, Seoul (KR); Soo Jy Ryu, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 676 days.

(21) Appl. No.: 17/631,323

(22) PCT Filed: Jul. 22, 2020

(86) PCT No.: PCT/KR2020/009657
§ 371 (c)(1),
(2) Date: Jan. 28, 2022

(87) PCT Pub. No.: WO2021/020802
PCT Pub. Date: Feb. 4, 2021

(65) Prior Publication Data
US 2022/0260883 A1    Aug. 18, 2022

(30) Foreign Application Priority Data

Jul. 29, 2019 (KR) .................. 10-2019-0091579

(51) Int. Cl.
*G02F 1/157* (2006.01)
*G02F 1/1335* (2006.01)
(Continued)

(52) U.S. Cl.
CPC ........ *G02F 1/157* (2013.01); *G02F 1/133509* (2013.01); *G02F 1/1506* (2013.01);
(Continued)

(58) Field of Classification Search
CPC .. G02F 1/157; G02F 1/133509; G02F 1/1506; G02F 1/1533; G02F 1/155; G02F 1/163
(Continued)

(56) References Cited

U.S. PATENT DOCUMENTS 7,990,034 B2    8/2011   Cha et al.
2010/0271721 A1  10/2010 Gaides et al.
(Continued)

FOREIGN PATENT DOCUMENTS

CN  104808384 A   7/2015
CN  106873209 A   6/2017
(Continued)

OTHER PUBLICATIONS

International Search Report dated Nov. 5, 2019 in International Application No. PCT/KR2020/009657.
(Continued)

*Primary Examiner* — Wyatt A Stoffa
*Assistant Examiner* — Grant A Gagnon
(74) *Attorney, Agent, or Firm* — Saliwanchik, Lloyd & Eisenschenk

(57) ABSTRACT

An optical path control member according to one embodiment comprises: a first substrate; a first electrode arranged on the first substrate; a second substrate arranged on the first substrate; a second electrode arranged below the second substrate; and a light conversion unit arranged between the first electrode and the second electrode, wherein the light conversion unit includes a barrier part and an accommodation part, which are alternately arranged, the accommodation part has a light transmittance that changes according to applied voltage, the first electrode extends in a first direction and includes a plurality of pattern electrodes spaced from each other, and the barrier part and the accommodation part extend in a second direction that differs from the first direction.

15 Claims, 22 Drawing Sheets

(51) Int. Cl.
  *G02F 1/1506* (2019.01)
  *G02F 1/153* (2006.01)
  *G02F 1/155* (2006.01)
  *G02F 1/163* (2006.01)

(52) U.S. Cl.
  CPC ............ *G02F 1/1533* (2013.01); *G02F 1/155* (2013.01); *G02F 1/163* (2013.01)

(58) Field of Classification Search
  USPC ....................................................... 359/245
  See application file for complete search history.

(56) References Cited

U.S. PATENT DOCUMENTS

| | | |
|---|---|---|
| 2011/0242146 A1 | 10/2011 | Uchida et al. |
| 2011/0242156 A1 | 10/2011 | Uchida et al. |
| 2019/0101806 A1 | 4/2019 | Takaya et al. |

FOREIGN PATENT DOCUMENTS

| | | |
|---|---|---|
| CN | 107621722 A | 1/2018 |
| CN | 108922918 A | 11/2018 |
| JP | 10-171379 A | 6/1998 |
| KR | 10-0579713 B1 | 5/2006 |
| KR | 10-0829504 B1 | 5/2008 |
| KR | 10-2011-0045296 A | 5/2011 |
| KR | 10-2015-0125051 A | 11/2015 |
| KR | 10-2016-0096263 A | 8/2016 |
| KR | 10-2018-0004879 A | 1/2018 |
| KR | 10-2019-0054484 A | 5/2019 |

OTHER PUBLICATIONS

Office Action dated May 19, 2023 in Chinese Application No. 202080054675.8.
Supplementary European Search Report dated Jun. 21, 2023 in European Application No. 20848576.3.
Office Action dated Jan. 3, 2025 in European Application No. 20 848 576.3.
Office Action dated Jan. 13, 2025 in Korean Application No. 10-2019-0091579.

LIGHT BLOCKING MODE

OPEN MODE

OPTICAL PATH CONTROL MEMBER AND DISPLAY DEVICE COMPRISING SAME

CROSS-REFERENCE TO RELATED APPLICATIONS

This application is the U.S. national stage application of International Patent Application No. PCT/KR2020/009657, filed Jul. 22, 2020, which claims the benefit under 35 U.S.C. § 119 of Korean Application No. 10-2019-0091579, filed Jul. 29, 2019, the disclosures of each of which are incorporated herein by reference in their entirety.

TECHNICAL FIELD

An embodiment relates to a light path control member capable of improving improved front luminance and capable of switching, and to a display device including the same.

BACKGROUND ART

A light-shielding film shields transmitting of light from a light source, and is attached to a front surface of a display panel which is a display device used for a mobile phone, a notebook, a tablet PC, a vehicle navigation device, a vehicle touch, etc., so that the light-shielding film adjusts a viewing angle of light according to an incident angle of light to express a clear image quality at a viewing angle needed by a user when the display transmits a screen.

In addition, the light-shielding film may be used for the window of a vehicle, building or the like to shield outside light partially to inhibit glare, or to inhibit the inside from being visible from the outside.

That is, the light-shielding film may control the movement path of light, block light in a specific direction, and transmit light in a specific direction.

Meanwhile, such a light-shielding film may be applied to a display device such as a navigation device or a vehicle dashboard in a movement means such as a vehicle. That is, the light-shielding film may be applied to various fields in accordance with various purposes.

In addition, the light-shielding film may be used in various environments of the user. For example, the light-shielding film may be used during the day or night, and may be applied in various environments, such as when the user requires a specific viewing angle or improved visibility.

However, since light transmittance of a light blocking pattern of the light-shielding film is fixed, the user may be restricted in using the light-shielding film in various environments.

Therefore, there is a need for an optical path control member having a new structure that may be applied in various use environments.

DISCLOSURE

Technical Problem

An embodiment is directed to providing an optical path control member that is driven in another mode according to application of a voltage and has improved front brightness, and a display device including the same.

Technical Solution

An optical path control member according to an embodiment includes: a first substrate; a first electrode disposed on the first substrate; a second substrate disposed on the first substrate; a second electrode disposed under the second substrate; and a light conversion unit disposed between the first electrode and the second electrode, wherein the light conversion unit includes a barrier part and an accommodation part alternately disposed, the accommodation part changes light transmittance according to application of a voltage, the first electrode includes a plurality of pattern electrodes extending in a first direction and spaced apart from each other, and the barrier part and the accommodation part extend in a second direction different from the first direction.

An optical path control member according to an embodiment includes: a first substrate; a first electrode disposed on the first substrate; a second substrate disposed on the first substrate; a second electrode disposed under the second substrate; and a light conversion unit disposed between the first electrode and the second electrode, wherein the light conversion unit includes a first pattern layer on the first electrode and a second pattern layer on the first pattern layer, the first pattern layer includes a plurality of embossed portions extending in a third direction, the second pattern layer includes a barrier part extending in a fourth direction different from the third direction and an accommodation part disposed between the barrier parts to change light transmittance according to application of a voltage.

Advantageous Effects

An optical path control member according to an embodiment can include a light conversion unit in which light transmittance is changed according to application of a voltage.

That is, when a voltage is not applied, an accommodation part of a light conversion unit of the optical path control member according to the embodiment can be driven as a light blocking part, and when the voltage is applied, the accommodation part can be driven as a light transmitting part.

Accordingly, the optical path control member according to the embodiment can be applied in various ways according to a user's usage environment.

In addition, a width of the accommodation part can be widened while the accommodation part of the optical path control member according to the embodiment extends from a light incident part toward a light emitting part. Further, when the voltage is applied, since light absorbing particles are moved in a direction in which the width is narrowed, the light absorbing particles can be easily moved, thereby improving efficiency of the optical path control member.

Further, the accommodation part can be disposed to be spaced apart from an electrode in a direction of a visual field surface or an electrode in a direction opposite to the direction of the visual field surface to reduce a decrease in light transmission by the accommodation part and improve brightness. Accordingly, visibility of the optical path control member can be improved.

In addition, in the optical path control member according to the embodiment, a region where a light blocking material such as light absorbing particles is not disposed is formed inside the accommodation part by patterning a first electrode, thereby improving front brightness by increasing the transmittance of light transmitted in a second mode, that is, an open mode compared with forming the first electrode as a surface electrode.

In addition, in the light path control member according to the embodiment, the region where the light blocking material such as the light absorbing particles is not disposed is formed inside the accommodation part by patterning first and second pattern layers, thereby improving the front brightness by increasing the transmittance of light transmitted in the second mode, that is, the open mode.

Therefore, it is possible to improve visibility of the user in a direction of a second substrate in the open mode by improving the front brightness.

MODES OF THE INVENTION

Hereinafter, embodiments of the present invention will be described in detail with reference to the accompanying drawings. However, the spirit and scope of the present invention is not limited to a part of the embodiments described, and may be implemented in various other forms, and within the spirit and scope of the present invention, one or more of the elements of the embodiments may be selectively combined and replaced.

In addition, unless expressly otherwise defined and described, the terms used in the embodiments of the present invention (including technical and scientific terms) may be construed the same meaning as commonly understood by one of ordinary skill in the art to which this invention belongs, and the terms such as those defined in commonly used dictionaries may be interpreted as having a meaning that is consistent with their meaning in the context of the relevant art.

In addition, the terms used in the embodiments of the present invention are for describing the embodiments and are not intended to limit the present invention. In this specification, the singular forms may also include the plural forms unless specifically stated in the phrase, and may include at least one of all combinations that may be combined in A, B, and C when described in "at least one (or more) of A (and), B, and C".

Further, in describing the elements of the embodiments of the present invention, the terms such as first, second, A, B, (a), and (b) may be used. These terms are only used to distinguish the elements from other elements, and the terms are not limited to the essence, order, or order of the elements.

In addition, when an element is described as being "connected", "coupled", or "connected" to another element, it may include not only when the element is directly "connected" to, "coupled" to, or "connected" to other elements, but also when the element is "connected", "coupled", or "connected" by another element between the element and other elements.

Further, when described as being formed or disposed "on (over)" or "under (below)" of each element, the "on (over)" or "under (below)" may include not only when two elements are directly connected to each other, but also when one or more other elements are formed or disposed between two elements.

Furthermore, when expressed as "on (over)" or "under (below)", it may include not only the upper direction but also the lower direction based on one element.

Hereinafter, an optical path control member according to an embodiment will be described with reference to drawings. The optical path control member described below relates to a switching optical path control member that drives in various modes according to application of a voltage. The optical path control member according to the embodiment may be used as a light blocking film. The optical path control member according to the embodiment may be used as a privacy film.

Figure 1:
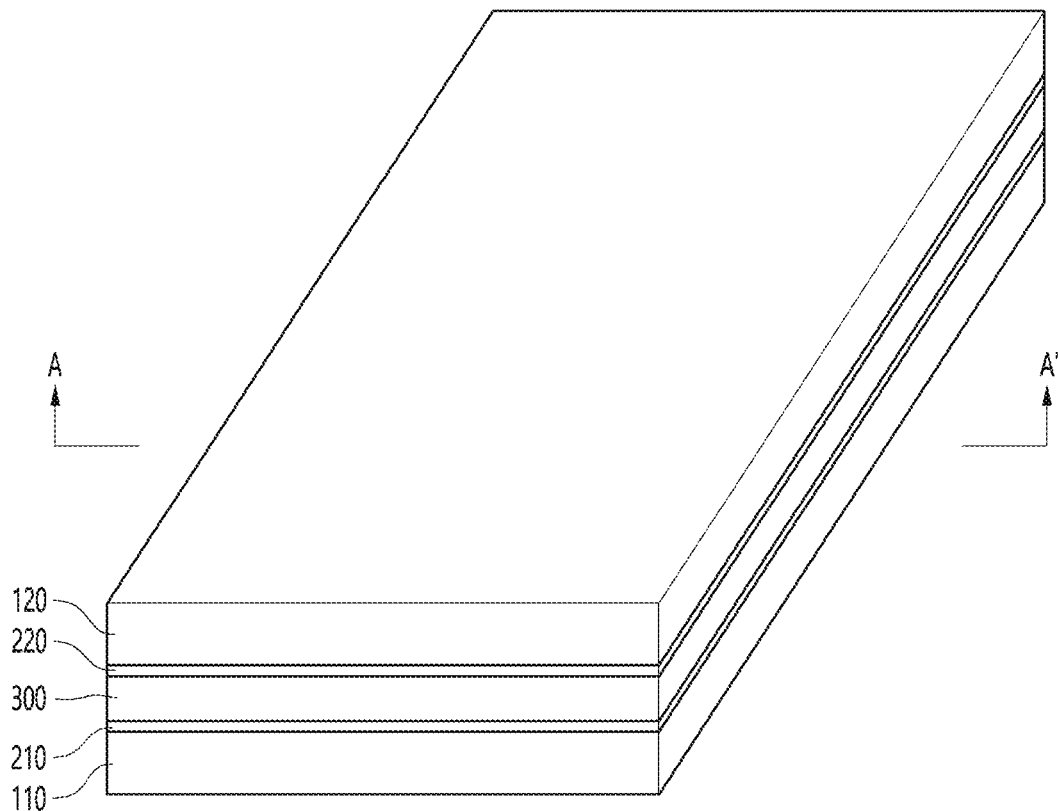
FIG. 1 is a perspective view of an optical path control member according to an embodiment.
Figure 2:
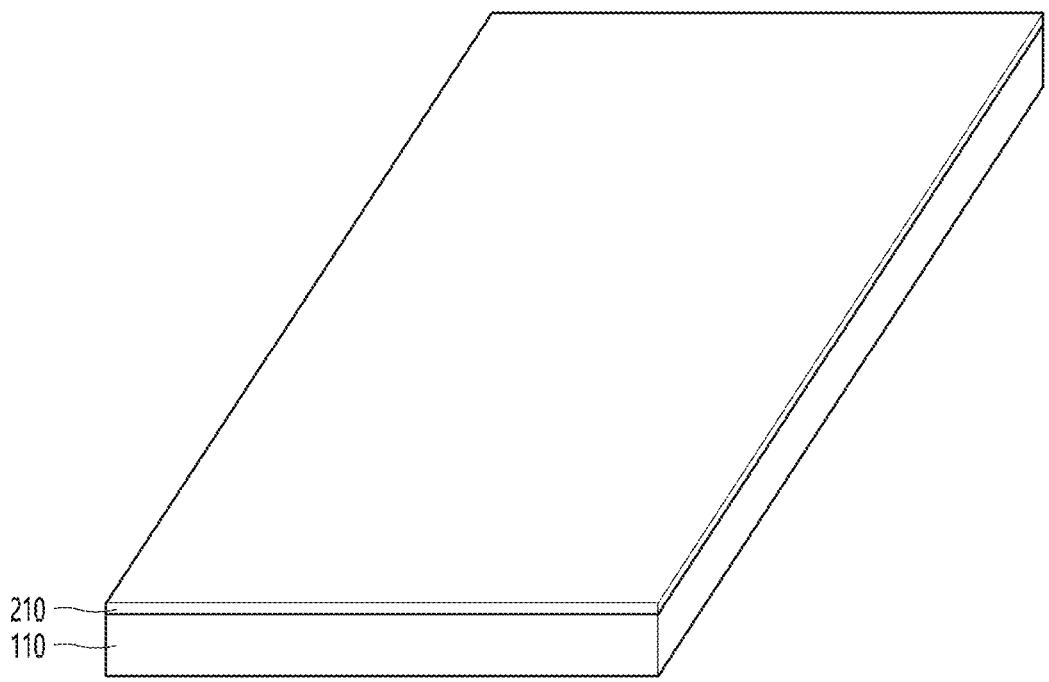
FIGS. 2 and 3 are views showing a perspective view of a first substrate and a first electrode and a perspective view of a second substrate and a second electrode of the optical path control member according to the embodiment, respectively.
Figure 3:
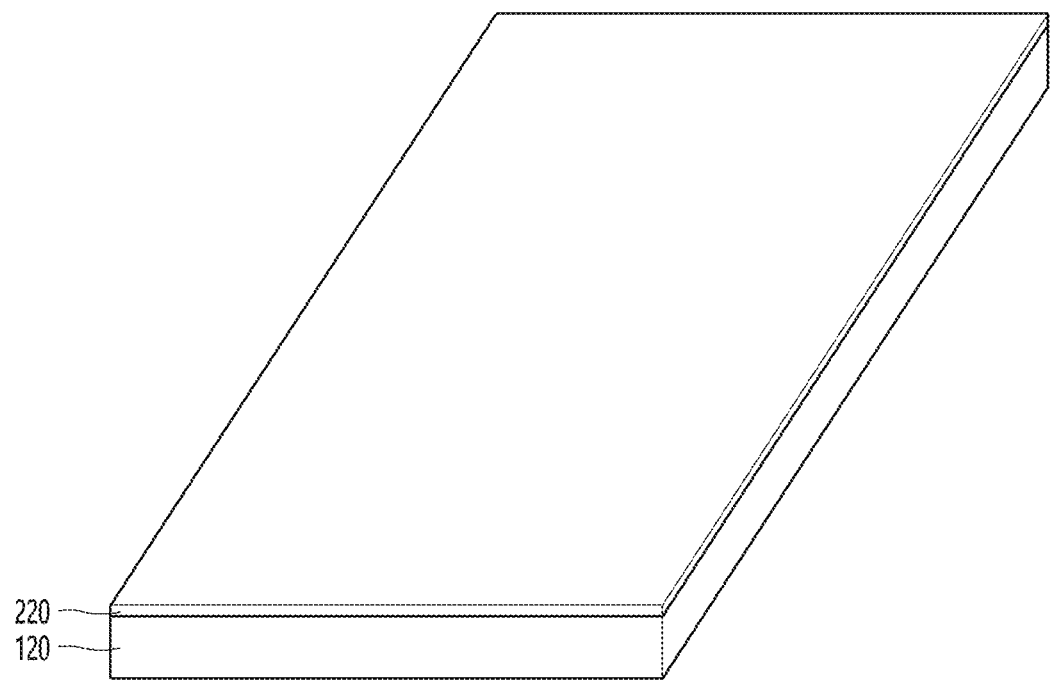

Referring to FIGS. 1 to 3, an optical path control member according to an embodiment may include a first substrate 110, a second substrate 120, a first electrode 210, a second electrode 220, and a light conversion unit 300.

The first substrate 110 may support the first electrode 210. The first substrate 110 may be rigid or flexible.

In addition, the first substrate 110 may be transparent. For example, the first substrate 110 may include a transparent substrate capable of transmitting light.

The first substrate 110 may include glass, plastic, or a flexible polymer film. For example, the flexible polymer film may be made of any one of polyethylene terephthalate (PET), polycarbonate (PC), acrylonitrile-butadiene-styrene copolymer (ABS), polymethyl methacrylate (PMMA), polyethylene naphthalate (PEN), polyether sulfone (PES), cyclic olefin copolymer (COC), triacetylcellulose (TAC) film, polyvinyl alcohol (PVA) film, polyimide (PI) film, and polystyrene (PS), which is only an example, but the embodiment is not limited thereto.

In addition, the first substrate 110 may be a flexible substrate having flexible characteristics.

Further, the first substrate 110 may be a curved or bended substrate. That is, the optical path control member including the first substrate 110 may also be formed to have flexible, curved, or bent characteristics. Accordingly, the optical path control member according to the embodiment may be changed to various designs.

The first substrate 110 may have a thickness of 10 μm to 100 μm.

The first electrode 210 may be disposed on one surface of the first substrate 110. In detail, the first electrode 210 may be disposed on an upper surface of the first substrate 110. That is, the first electrode 210 may be disposed between the first substrate 110 and the second substrate 120.

The first electrode 210 may contain a transparent conductive material. For example, the first electrode 210 may contain a metal oxide such as indium tin oxide, indium zinc oxide, copper oxide, tin oxide, zinc oxide, titanium oxide, etc.

The first electrode 210 may transmit light. In detail, light transmittance of the first electrode 210 may be about 80% or more.

The first electrode 210 may have a thickness of 0.05 μm to 2 μm.

Alternatively, the first electrode 210 may contain various metals to realize low resistance. For example, the first electrode 210 may contain at least one metal of chromium (Cr), nickel (Ni), copper (Cu), aluminum (Al), silver (Ag), molybdenum (Mo). gold (Au), titanium (Ti), and alloys thereof.

The first electrode 210 may be formed in a film shape. In detail, the first electrode 210 may be formed as a surface electrode. Alternatively, the first electrode 210 may include a plurality of patterns. In detail, the first electrode 210 may include a plurality of pattern electrodes spaced apart from each other.

The shape of the first electrode 210 and its effects will be described in detail below.

The second substrate 120 may be disposed on the first substrate 110. In detail, the second substrate 120 may be disposed on the first electrode 210 on the first substrate 110.

The second substrate 120 may contain a material capable of transmitting light. The second substrate 120 may contain a transparent material. The second substrate 120 may contain a material the same as or similar to that of the first substrate 110 described above.

For example, the second substrate 120 may include glass, plastic, or a flexible polymer film. For example, the flexible polymer film may be made of any one of polyethylene terephthalate (PET), polycarbonate (PC), acrylonitrile-butadiene-styrene copolymer (ABS), polymethyl methacrylate (PMMA), polyethylene naphthalate (PEN), polyether sulfone (PES), cyclic olefin copolymer (COC), triacetylcellulose (TAC) film, polyvinyl alcohol (PVA) film, polyimide (PI) film, and polystyrene (PS), which is only an example, but the embodiment is not limited thereto.

In addition, the second substrate 120 may be a flexible substrate having flexible characteristics.

Further, the second substrate 120 may be a curved or bended substrate. That is, the optical path control member including the second substrate 120 may also be formed to have flexible, curved, or bent characteristics. Accordingly, the optical path control member according to the embodiment may be changed to various designs.

The second substrate 120 may have a thickness of 10 μm to 100 μm.

The second electrode 220 may be disposed on one surface of the second substrate 120. In detail, the second electrode 220 may be disposed on a lower surface of the second substrate 120. That is, the second electrode 220 may be disposed on a surface on which the second substrate 120 faces the first substrate 110. That is, the second electrode 220 may be disposed facing the first electrode 210 on the first substrate 110. That is, the second electrode 220 may be disposed between the first electrode 210 and the second substrate 120.

The second electrode 220 may contain a transparent conductive material. For example, the second electrode 220 may contain a metal oxide such as indium tin oxide, indium zinc oxide, copper oxide, tin oxide, zinc oxide, titanium oxide, etc.

The second electrode 220 may be disposed on the first substrate 110 in a film shape. That is, the second electrode 220 may be formed as a surface electrode. In addition, the light transmittance of the second electrode 220 may be about 80% or more.

The second electrode 220 may have a thickness of 0.05 μm to 2 μm.

Alternatively, the second electrode 220 may contain various metals to realize low resistance. For example, the second electrode 220 may contain at least one metal of chromium (Cr), nickel (Ni), copper (Cu), aluminum (Al), silver (Ag), molybdenum (Mo). gold (Au), titanium (Ti), and alloys thereof.

Alternatively, the second electrode 220 may include a plurality of conductive patterns. For example, the second electrode 220 may include a plurality of mesh lines intersecting each other and a plurality of mesh openings formed by the mesh lines.

Accordingly, even though the second electrode 220 contains a metal, visibility may be improved because the second electrode 220 is not visible from the outside. In addition, the light transmittance is increased by the openings, so that the brightness of the optical path control member according to the embodiment may be improved.

FIGS. 4 to 7 are views showing a cross-sectional view of a light path control member taken along line A-A' of FIG. 1.

Referring to FIGS. 4 to 7, the light conversion unit 300 may be disposed between the first substrate 110 and the second substrate 120. In detail, the light conversion unit 300 may be disposed between the first electrode 210 and the second electrode 220.

The light conversion unit 300 may include a barrier part 310, and an accommodation part 320.

The barrier part 310 may be defined as a region through which light is transmitted, and the accommodation part 320 may be defined as a variable region that is variable to a light blocking part and a light transmitting part according to application of a voltage.

The barrier part 310 and the accommodation part 320 may be alternately disposed. The barrier part 310 and the accommodation part 320 may be disposed in different widths. For example, the width of the accommodation part 320 may be greater than the width of the accommodation part 320.

The barrier part 310 and the accommodation part 320 may be disposed in contact with at least one of the first electrode 210 and the second electrode 220.

For example, the barrier part 310 and the accommodation part 320 may be disposed in direct contact with the first electrode 210 and may be disposed in indirect contact with the second electrode 220. That is, an adhesive layer 400 for adhering the first substrate 110 and the second substrate 120 may be disposed on the light conversion unit 300, and the barrier part 310 and the accommodation part 320 may be disposed in indirect contact with the second electrode 220.

Meanwhile, although not shown in the drawings, a buffer layer for improving adhesion of the light conversion unit 300 may be additionally disposed between the first electrode 210 and the light conversion unit 300.

The adhesive layer 400 may adhere the light conversion unit 300 and the second electrode 220 to each other and may have a light transmittance of about 85% or more, thereby transmitting light toward the second substrate 120.

The barrier part 310 and the accommodation part 320 may be alternately disposed. In detail, the barrier part 310 and the accommodation part 320 may be alternately disposed. That is, each of the barrier parts 310 may be disposed between the accommodation parts 320 adjacent to each other, and each of the accommodation parts 320 may be disposed between the barrier parts 310 adjacent to each other.

The barrier part 310 may contain a transparent material. The barrier part 310 may contain a material that may transmit light.

The barrier part 310 may contain a resin material. For example, the barrier part 310 may contain a photo-curable resin material. As an example, the barrier part 310 may contain a UV resin or a transparent photoresist resin. Alternatively, the barrier part 310 may contain urethane resin or acrylic resin.

The barrier part 310 may transmit light incident on any one of the first substrate 110 and the second substrate 120 toward another substrate.

For example, in FIGS. 4 to 7, light may be incident in a direction of the first substrate 110 and the light may be emitted to the first substrate 110. The barrier part 310 may transmit the light, and the transmitted light may be moved in a direction of the second substrate 120 to be emitted toward a user of the direction of the second substrate 120.

The accommodation part 320 may include a material that changes the accommodation part into the light transmitting part and the light blocking part. The accommodation part 320 may include an electrolyte 320a and light absorbing particles 320b. In detail, the accommodation part 320 is filled with the electrolyte 320a, and a plurality of the light absorbing particles 320b may be dispersed in the electrolyte 320a.

The electrolyte 320a may be a material for dispersing the light absorbing particles 320b. The electrolyte 320a may contain a transparent material. The electrolyte 320a may contain a paraffinic solvent. In addition, the electrolyte 320a may contain a material capable of transmitting light.

The light absorbing particles 320b may be disposed to be dispersed in the electrolyte 320a. In detail, the plurality of light absorbing particles 320b may be disposed to be spaced apart from each other in the electrolyte 320a. The light absorbing particles 320b may block light. That is, the light absorbing particles 320b inside the accommodation part 320 may absorb the light incident on the accommodation part 320 to block the light.

The light absorbing particles 320b may include a color. For example, the light absorbing particles 320b may have a black color. As an example, the light absorbing particles 320b may include carbon black. That is, the light absorbing particles 320b may be carbon black particles.

The light absorbing particles 320b may be formed in a spherical shape or a circular shape. The light absorbing particles 320b may have a diameter of several nanometers.

The light transmittance of the accommodation part 320 may be changed by the light absorbing particles 320b. In detail, the accommodation part 320 may be changed into the light blocking part and the light transmitting part by changing the light transmittance due to the movement of the light absorbing particles 320b.

For example, the optical path control member according to the embodiment may be changed from a first mode to a second mode or from the second mode to the first mode by a voltage applied to the first electrode 210 and the second electrode 220.

In detail, in the optical path control member according to the embodiment, the accommodation part 320 becomes the light blocking part in the first mode, and light of a specific angle may be blocked by the accommodation part 320. That is, a viewing angle of the user viewing from the outside is narrowed, so that a narrow viewing angle mode may be set.

In detail, in the first mode in which a voltage is not applied to a pattern part, the light absorbing particles 320b are uniformly dispersed in the electrolyte 320a so that the accommodation part 320 may block the light by the light absorbing particles to be the light blocking part.

In addition, in the optical path control member according to the embodiment, the accommodation part 320 becomes the light transmitting part in the second mode, and in the optical path control member according to the embodiment, light may be transmitted through both the barrier part 310 and the accommodation part 320. That is, the viewing angle of the user viewing from the outside may be widened.

In detail, in the second mode in which a voltage is applied to the pattern part, the light absorbing particles 320b are agglomerated into one region of the electrolyte 320a so that the accommodation part 320 may transmit light by the electrolyte to be the light transmitting part.

Switching from the first mode to the second mode, that is, the conversion of the accommodation part 320 from the light blocking part to the light transmitting part may be realized by movement of the light absorbing particles 320b of the accommodation part 320.

In detail, the accommodation part 320 may be electrically connected to the first electrode 210 and the second electrode 220.

In this case, when a voltage is not applied to the optical path control member from the outside, the light absorbing particles 320b of the accommodation part 320 are uniformly dispersed in the electrolyte 320a, and the accommodation part 320 may block light by the light absorbing particles. Accordingly, in the first mode, the accommodation part 320 may be driven as the light blocking part.

Alternatively, when a voltage is applied to the optical path control member from the outside, the light absorbing particles 320b may move. For example, the light absorbing particles 320b may move toward one end or the other end of the accommodation part 320 by a voltage transmitted through the first electrode 210 and the second electrode 220 to be agglomerated. That is, the light absorbing particles 320b may move from the accommodation part 320 toward the first electrode or the second electrode to be agglomerated.

As a method of moving the light absorbing particles, first, the light absorbing particles including the carbon black may be charged. For example, micelles may be formed and a charging effect may be created by charging the carbon black themselves with a negative charge or chemically introducing a functional group similar to a surfactant to a surface of the carbon black to charge the light absorbing particles.

Subsequently, when a voltage is applied to the first electrode 210 and/or the second electrode 220, an electric field is formed between the first electrode 210 and the second electrode 220, and the charged carbon black may be moved toward a positive electrode of the first electrode 210 and the second electrode 220 using the electrolyte 320a as a medium.

Figure 5:
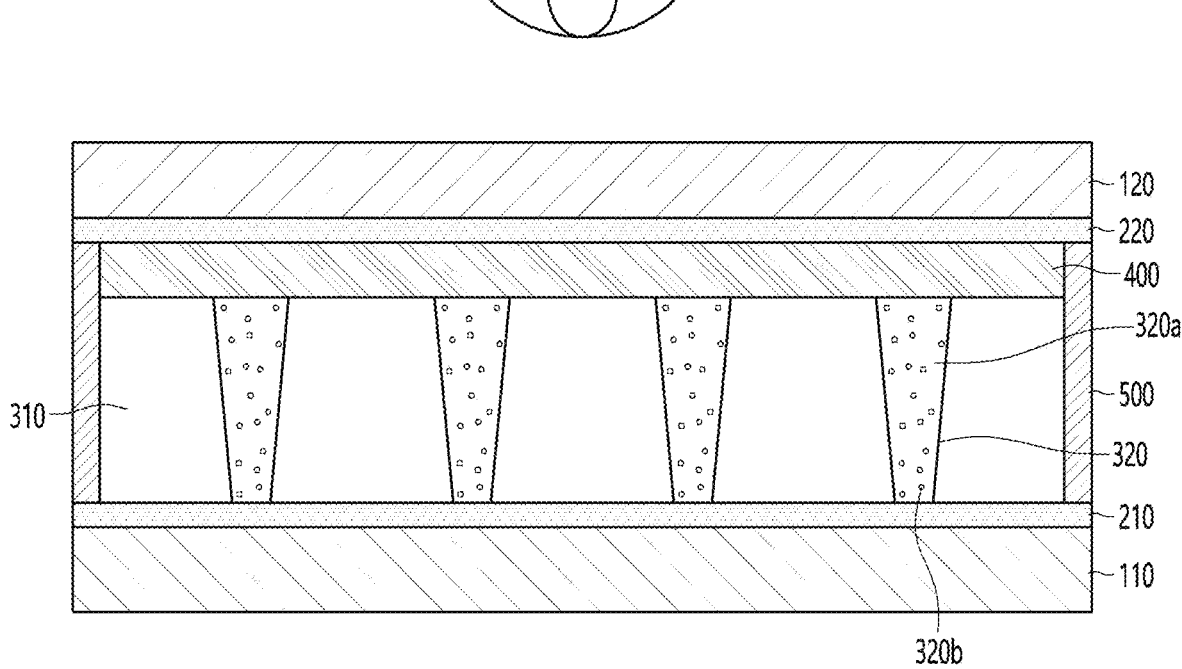
Figure 7:
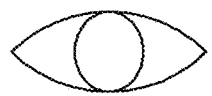
Figure 7:
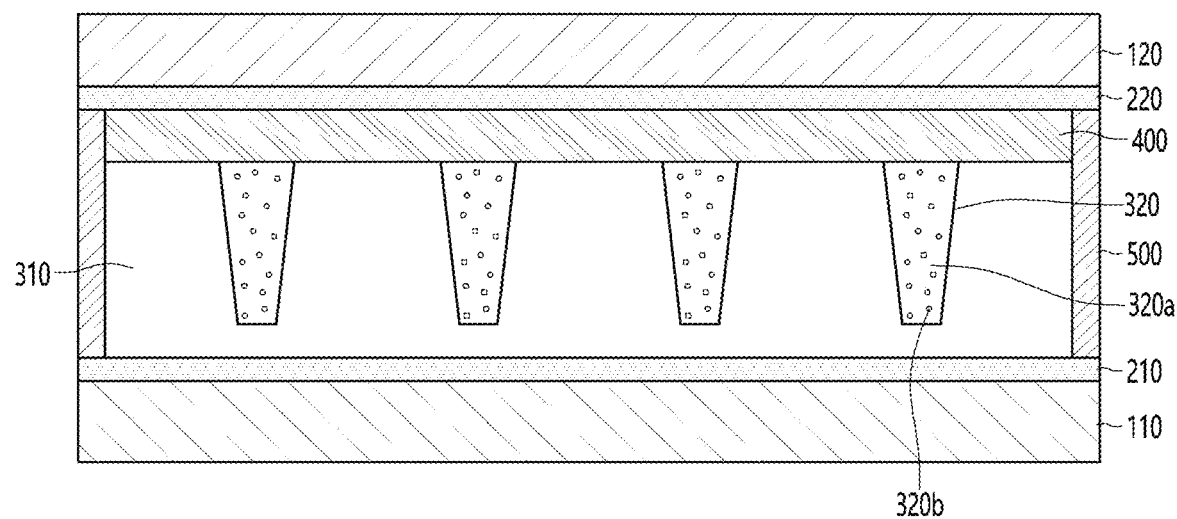

That is, when the voltage is not applied to the first electrode 210 and/or the second electrode 220, as shown in FIGS. 5 and 7, the light absorbing particles 320b may be uniformly dispersed in the electrolyte 320a to drive the accommodation part 320 as the light blocking part.

Figure 4:
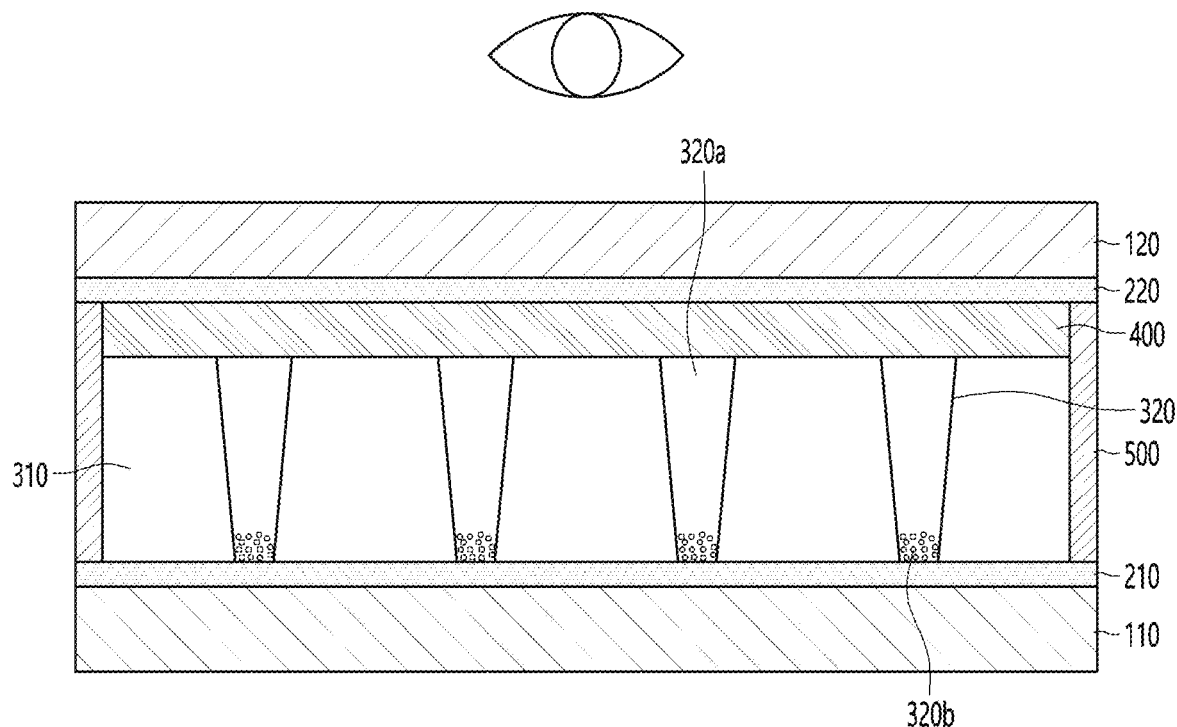
FIGS. 4 to 7 are views showing a cross-sectional view taken along line A-A' of FIG. 1.
Figure 6:
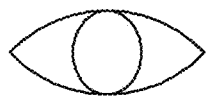
Figure 6:
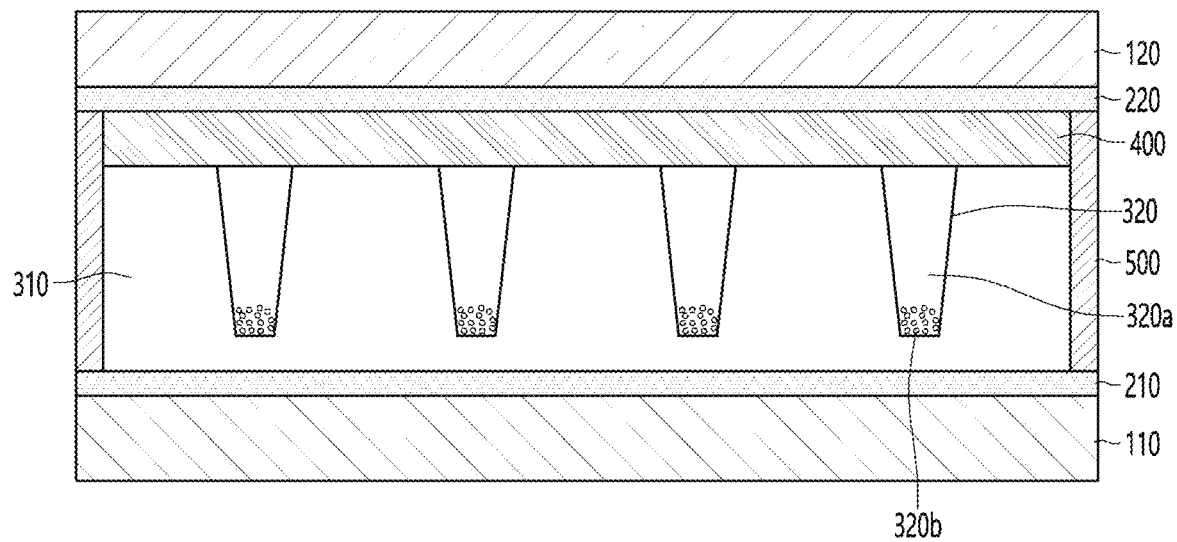

In addition, when the voltage is applied to the first electrode 210 and/or the second electrode 220, as shown in FIGS. 4 and 6, the light absorbing particles 320b may be moved toward the second electrode 220 in the electrolyte 320a. That is, the light absorbing particles 320b are moved in one direction, and the accommodation part 320 may be driven as the light transmitting part.

Accordingly, the optical path control member according to the embodiment may be driven in two modes according to a user's surrounding environment. That is, when the user requires light transmission only at a specific viewing angle, the accommodation part is driven as the light blocking part, or in an environment in which the user requires high brightness, a voltage may be applied to drive the accommodation part as the light transmitting part.

Therefore, since the optical path control member according to the embodiment may be implemented in two modes according to the user's requirement, the optical path control member may be applied regardless of the user's environment.

The foregoing description describes that only an electrolyte and the light absorbing particles dispersed in the electrolyte are accommodated in the accommodation part 320, but the embodiment is not limited thereto, and the accommodation part 320 may accommodate liquid crystal molecules such as a polymer dispersed liquid crystal (PDLC) or a polymer network liquid crystal (PNLC) or may accommodate organic or inorganic electrochromic materials, and various materials of liquid, solid, and gel-type capable of changing the light transmittance of the accommodation part may be accommodated in the accommodation part.

Meanwhile, the accommodation part 320 may be formed in various shapes.

Referring to FIGS. 4 and 5, a width of the accommodation part 320 may be changed while the accommodation part 320 extends from one end of the accommodation part 320 to the other end thereof.

For example, referring to FIGS. 4 and 5, the accommodation part 320 may be formed in a trapezoidal shape. In detail, the accommodation part 320 may be formed so that the width of the accommodation part 320 is widened while extending from the first electrode 210 toward the second electrode 220.

That is, the width of the accommodation part 320 may be narrower while extending from a visual field surface of the user toward an opposite surface thereof. In addition, when a voltage is applied to the light conversion unit, the light absorbing particles of the accommodation part 320 may be moved in a direction in which the width of the accommodation part is narrowed.

That is, the width of the of the accommodation part 320 may be widened while extending from a light incident part in which light is incident toward a light emitting part in which light is emitted.

That is, the light absorbing particles of the accommodation part 320 may be moved toward the first electrode 210.

Accordingly, since the light absorbing particles are moved toward the opposite surface of the visual field surface instead of the visual field surface, it is possible to inhibit blocking of light emitted toward the visual field surface, thereby improving the brightness of the optical path control member.

In addition, since the light absorbing particles are moved from a wide region toward a narrow region, the light absorbing particles may be easily moved.

In addition, since the light absorbing particles move to the narrow region of the accommodation part, an amount of light transmitted toward the visual field surface of the user is increased, thereby improving front brightness.

Or, conversely, the accommodation part 320 may be formed so that the width of the accommodation part 320 is narrowed while extending from the first electrode 210 toward the second electrode 220.

That is, the width of the accommodation part 320 may be widened while extending from the visual field surface of the user toward the opposite surface thereof. In addition, when a voltage is applied to the light transmitting part, the light absorbing particles of the accommodation part 320 may be moved in a direction in which the width of the accommodation part is widened.

That is, the width of the of the accommodation part 320 may be narrowed while the accommodation part 320 extends from the light incident part in which the light is incident toward the light emitting part in which the light is emitted.

That is, the light absorbing particles of the of the accommodation part 320 may be moved toward the first electrode 210.

Accordingly, a contact region between the first electrode and one surface of the accommodation part through which the light absorbing particles move is increased, so that a moving speed of the light absorbing particles, that is, a driving speed may be increased.

Meanwhile, the accommodation part 320 may be disposed to be spaced apart from the first electrode 210 or the second electrode 220. That is, the accommodation part 320 may be disposed in contact with only one of the first electrode 210 and the second electrode 220.

For example, referring to FIGS. 6 and 7, the accommodation part 320 may be spaced apart from the first electrode 210 and may be in contact with the adhesive layer 400.

The same as or similar to the material of the barrier part 310 may be disposed in a region where the accommodation part 320 and the first electrode 210 are spaced apart from each other. That is, in the light conversion unit 300, a base part may be formed between the accommodation part 320 and the adhesive layer 400.

Meanwhile, as described above, the first electrode 210 may be patterned to form a film-shaped surface electrode or to include the plurality of pattern electrodes.

The optical path control member according to the embodiment may improve the front brightness of the optical path control member according to a shape of the first electrode or a shape of the light conversion unit.

First, a first embodiment in which the first electrode is patterned will be described with reference to FIGS. 8 to 20.

Figure 8:
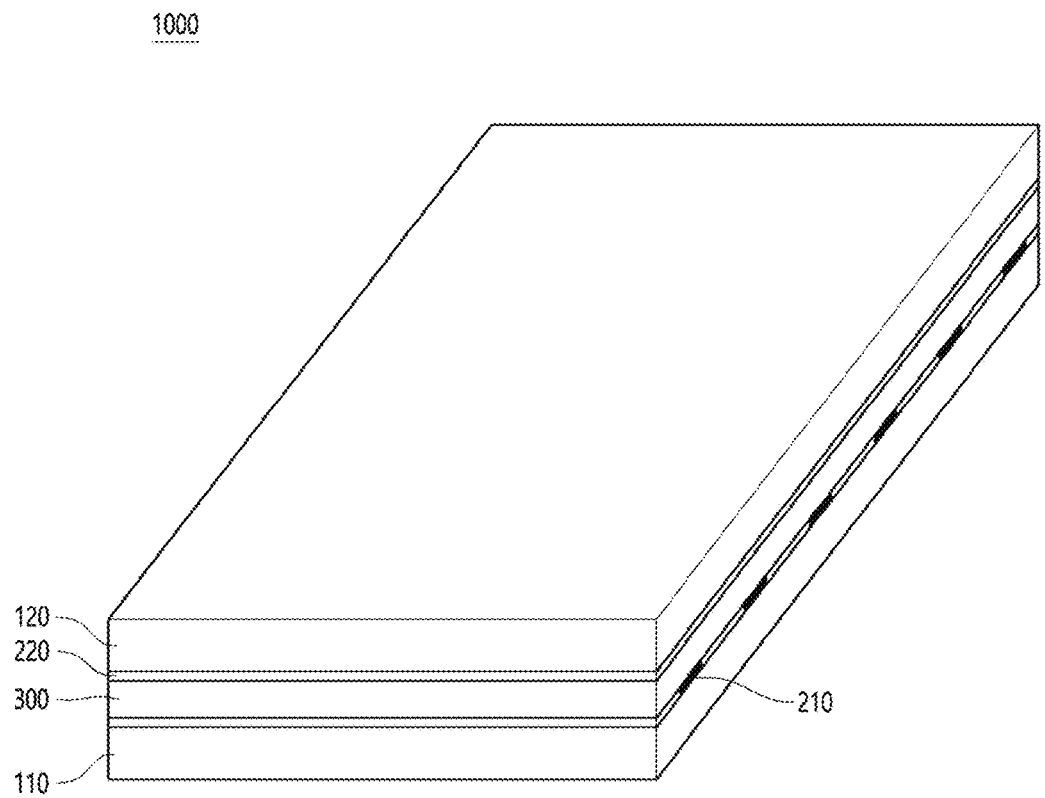
FIG. 8 is a perspective view of an optical path control member according to a first embodiment.

Referring to FIG. 8, in the optical path control member according to the first embodiment, the first electrode 210 may be patterned to include a plurality of pattern electrodes spaced apart from each other. In detail, the first electrode 210 between the first substrate 110 and the light conversion unit 300 may include pattern electrodes 211 spaced apart from each other.

Figure 9:
FIG. 9 is a top view showing the arrangement of a first electrode disposed on a first substrate of the optical path control member according to the first embodiment.

Referring to FIG. 9, the first electrode 210 may be disposed on the first substrate 110, and the first electrode 210 may include a plurality of pattern electrodes 211.

The pattern electrodes 211 may be disposed to be spaced apart from each other on the first substrate 110. A line width w of each of the pattern electrodes 211 may be greater than a separation distance s of the pattern electrodes 211.

For example, the line width w of each of the pattern electrodes 211 may be about 35 μm to about 40 μm, and the separation distance s of the pattern electrodes 211 may be about 25 μm to 30 μm.

The pattern electrode 211 may be disposed to extend in one direction. In detail, the pattern electrode 211 may be formed to extend in a first direction. That is, the plurality of pattern electrodes 211 may be disposed to extend in the first direction and to be spaced apart from each other on the first substrate 110.

Figure 10:
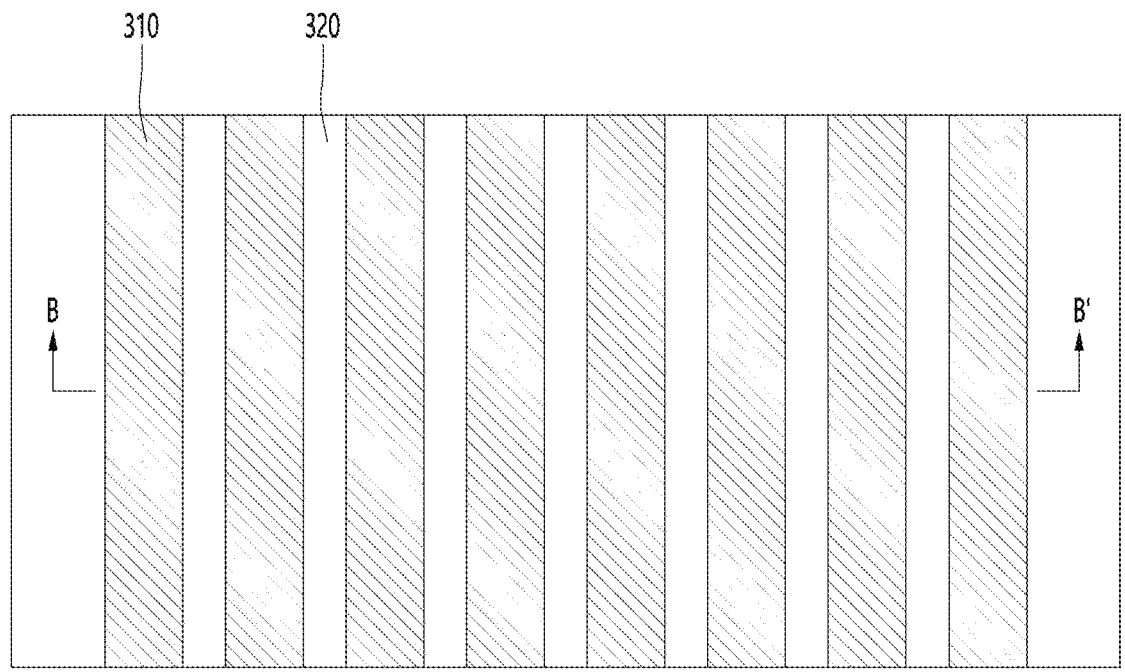
FIG. 10 is a top view of a light conversion unit of the optical path control member according to the first embodiment.
Figure 11:
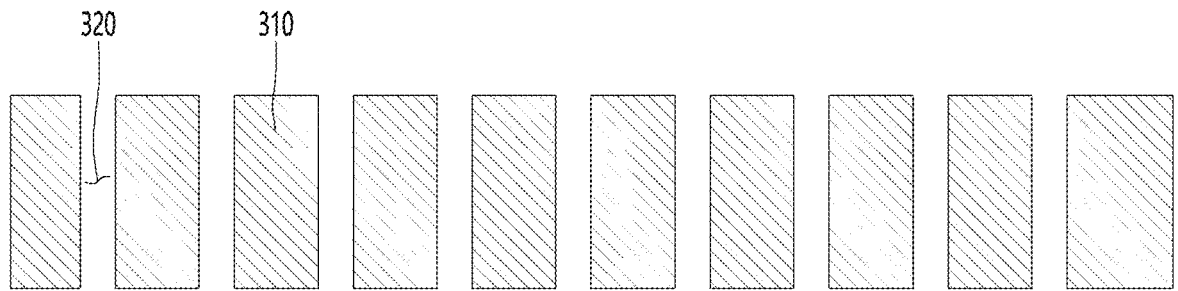
FIG. 11 is a cross-sectional view taken along line B-B' of FIG. 10.

FIG. 10 is a top view of the light conversion unit 300, and FIG. 11 is a cross-sectional view taken along line B-B' of FIG. 10. Referring to FIGS. 10 and 11, the light conversion unit 300 may include the barrier part 310 and the accommodation part 320.

Referring to FIG. 11, the barrier part 310 may be formed to be embossed, and the accommodation part 320 may be formed to be engraved in order to fill the electrolyte 320a and the light absorbing particles 320b in the accommodation part 320. For example, the accommodation part 320 may be defined as a hole or a groove formed in a resin layer forming the light conversion unit 300.

Referring to FIG. 10, the barrier part 310 and the accommodation part 320 may be disposed to extend in one direction. In detail, the barrier part 310 formed to be embossed may be disposed to extend in one direction. In detail, the barrier part 310 may be disposed to extend in a second direction.

The first direction that is a direction of the pattern electrode 211 of the first electrode and the second direction that is an extension direction of the barrier part 310 may be different directions.

In detail, the second direction may be inclined at an angle of about 10° or more with respect to the first direction. In more detail, the second direction may be inclined at an angle of 10° to 170° with respect to the first direction.

That is, the barrier part 310 may be inclined and extended at an angle of 10° to 170° with respect to the pattern electrode 211 of the first electrode. Accordingly, the pattern electrode 211 and the barrier part 310 may be formed to partially cross each other.

Figure 12:
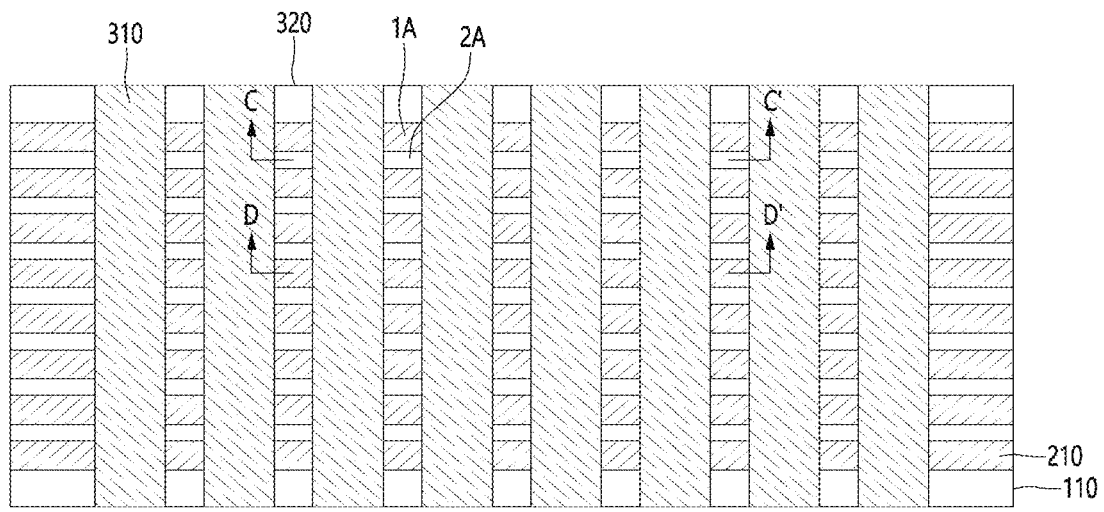
FIG. 12 is a top view in which the first substrate of the optical path control member and the light conversion unit according to the first embodiment overlap with each other.

FIG. 12 is a top view in which the first substrate 110 on which the first electrode 210 is formed overlaps the light conversion unit 300. FIG. 12 is a view showing an example in which the pattern electrode 211 and the barrier part 310 are inclined and extended at an angle of about 90°.

Referring to FIG. 12, the pattern electrodes 211 of the first electrode may be disposed to extend in the first direction, and the barrier part 310 may be extended in the second direction inclined at an angle of 90° with respect to the first direction.

Accordingly, the accommodation part 320 between the barrier parts 310 may include a first region 1A in which the pattern electrode 211 is disposed and a second region 2A in which the pattern electrode 211 is not disposed.

That is, the first region 1A in which the pattern electrode is disposed and the second region 2A in which the pattern electrode is not disposed may be alternately formed in the accommodation part 320.

Figure 13:
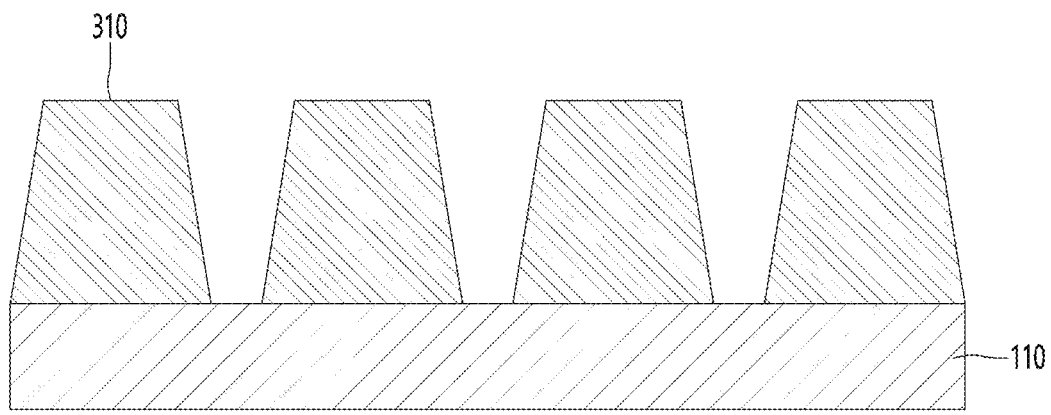
FIG. 13 is a cross-sectional view taken along line C-C' of FIG. 12.
Figure 14:
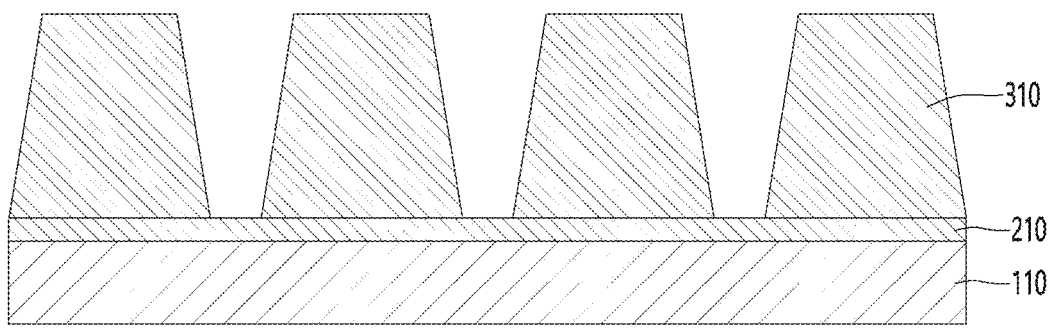
FIG. 14 is a cross-sectional view taken along line D-D' of FIG. 12.

FIGS. 13 and 14 are cross-sectional views taken along lines C-C' and D-D' of FIG. 12, respectively.

Referring to FIG. 13, the first electrode 210 may not be disposed under the accommodation part 320, and referring to FIG. 14, the first electrodes, that is, the pattern electrodes 211, may be disposed under the accommodation part.

That is, one accommodation part 320 may include both a region overlapping the first electrode 210 and a region not overlapping the first electrode 210.

Figure 15:
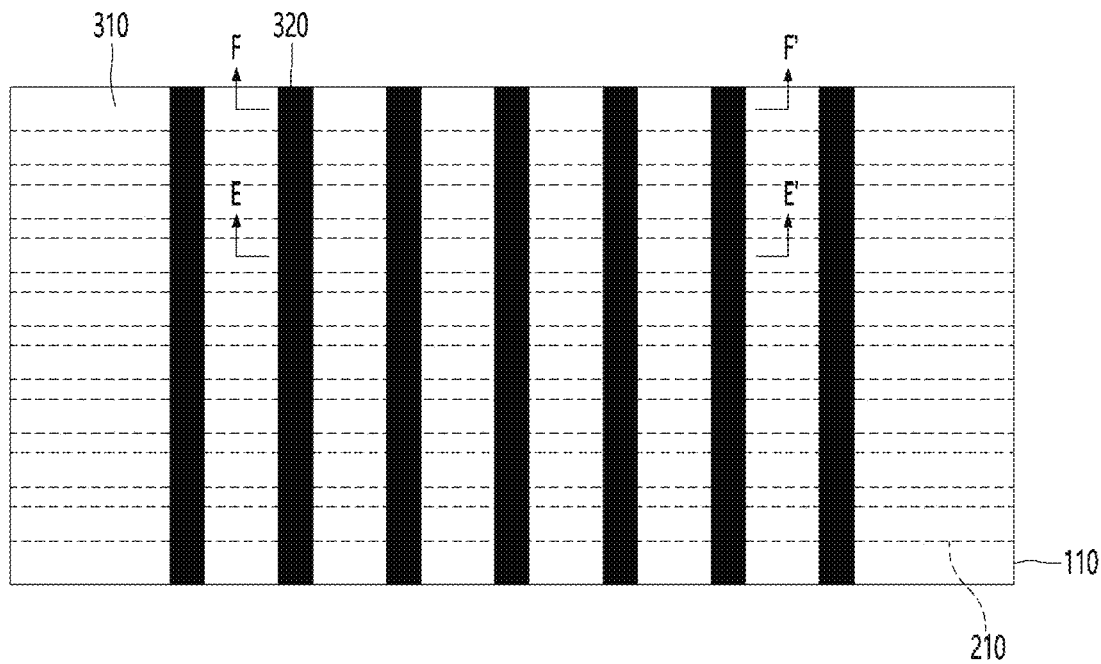
FIGS. 15 and 16 are top views according to whether a voltage is applied to the optical path control member according to the first embodiment.
Figure 16:
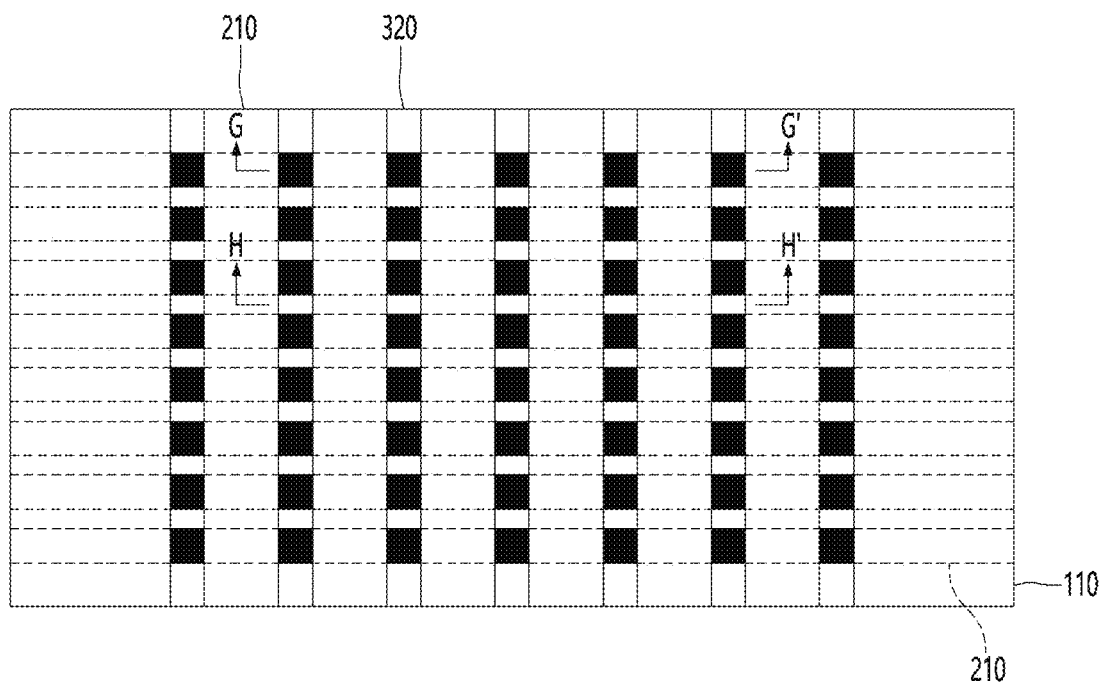

FIGS. 15 and 16 are top views according to whether a voltage is applied to the optical path control member according to the embodiment, and FIGS. 17 to 20 are cross-sectional views taken along line E-E' of FIG. 15, line F-F' of FIG. 15, line G-G' of FIG. 16, and line H-H' of FIG. 16, respectively.

Figure 17:
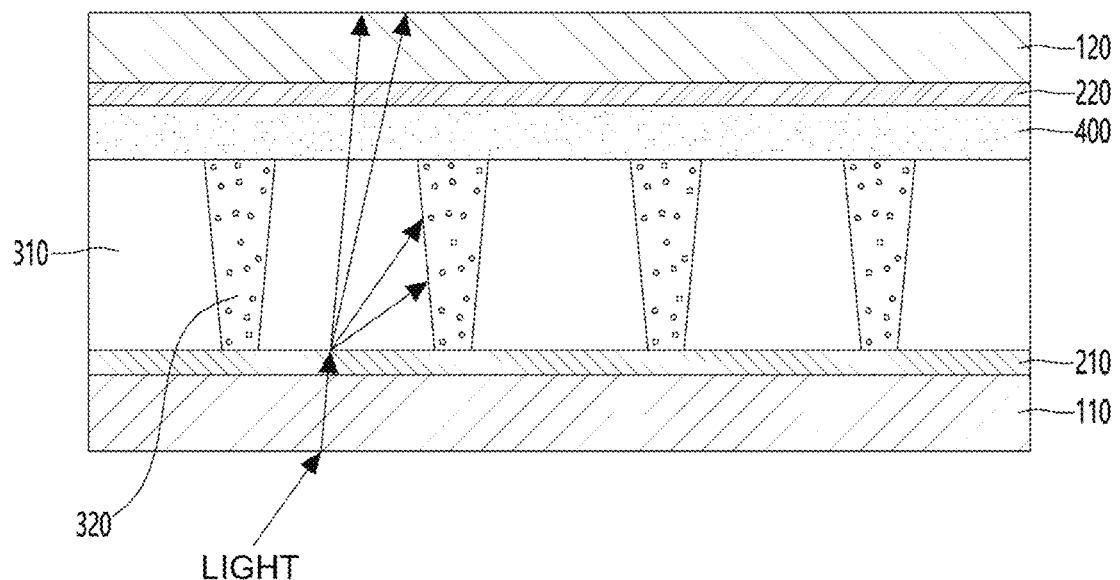
FIG. 17 is a cross-sectional view taken along line E-E' of FIG. 15.
Figure 18:
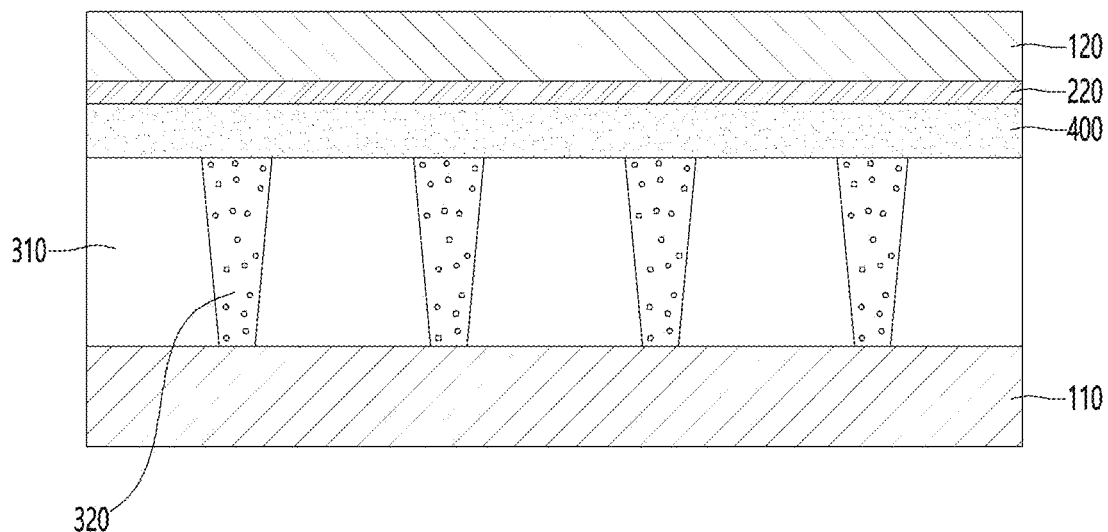
FIG. 18 is a cross-sectional view taken along line F-F' of FIG. 15.

FIGS. 15, 17, and 18 are views showing the first mode in which a voltage is not applied to the optical path control member, that is, a light blocking mode, and as described above, when a voltage is not applied to the optical path control member, the accommodation part 320 may act as a light blocking part. That is, the light absorbing particles 320b inside the electrolyte 320a are uniformly dispersed in the accommodation part 320, so that the accommodation part may act as the light blocking part that blocks light.

Referring to FIGS. 17 and 18, in the first mode in which the voltage is not applied to the optical path control member, that is, in the light blocking mode, the electrolyte and the light absorbing particles may be uniformly dispersed in both the region where the accommodation part 320 overlaps the first electrode 210 and the region where the accommodation part 320 does not overlap the first electrode 210 to fill the accommodation part 320.

Accordingly, as shown in FIG. 17, light incident on the first substrate 110 and emitted toward the second substrate 120 may be partially blocked by the accommodation part 320.

Figure 19:
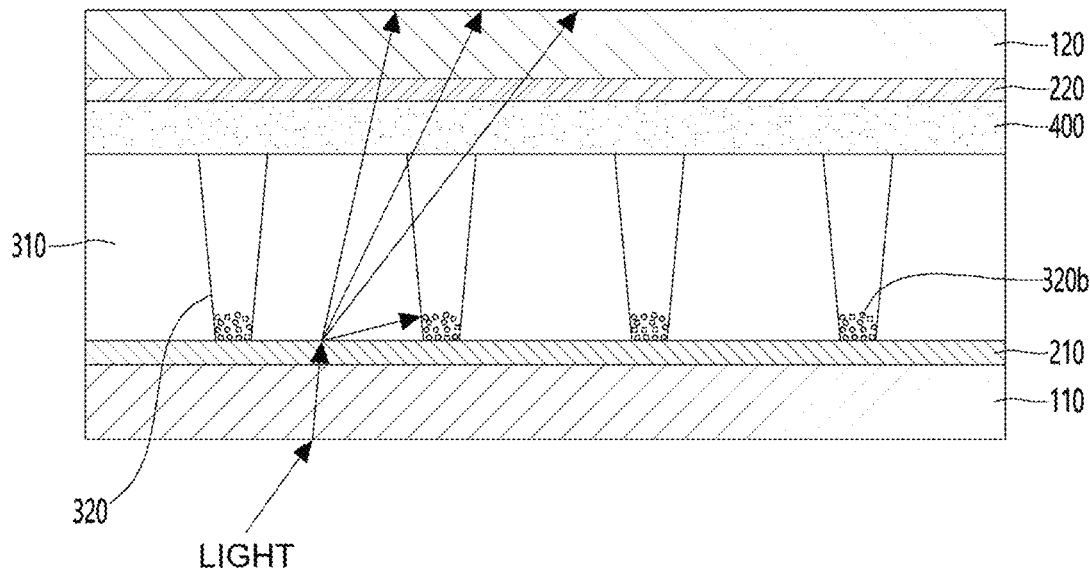
FIG. 19 is a cross-sectional view taken along line G-G' of FIG. 16.
Figure 20:
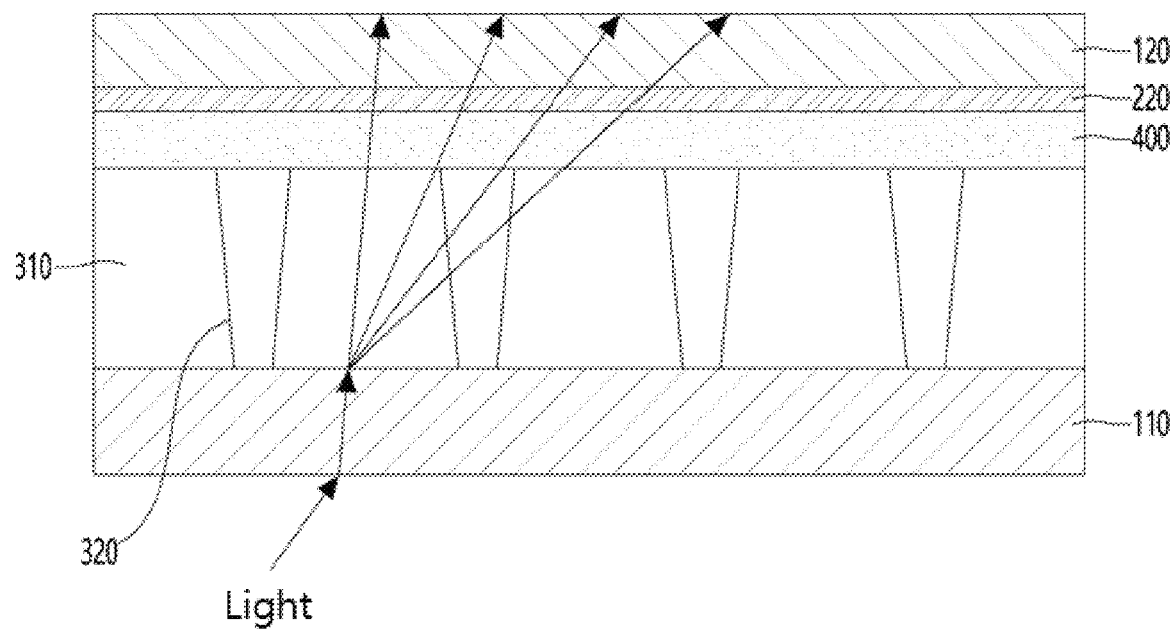
FIG. 20 is a cross-sectional view taken along line H-H' of FIG. 16.

FIGS. 16, 19, and 20 are views showing the second mode in which a voltage is applied to the optical path control member, that is, an open mode, and as described above, when the voltage is applied to the optical path control member, the accommodation part 320 may act as the light transmitting part. That is, in the accommodation part 320, the light absorbing particles 320b inside the electrolyte 320a are aggregated into one end region of the accommodation part 320, and the accommodation part 320 may act as the light transmitting part that transmits light.

Meanwhile, referring to FIG. 16, the light absorbing particles may be aggregated only in a region where the first electrode 210 is disposed inside the accommodation part 320. That is, the light absorbing particles 320b may be aggregated only in a region where the first electrode 210 to which the voltage is applied is disposed.

That is, referring to FIGS. 18 and 19, the light absorbing particles 320b may be not disposed in a region where the first electrode 210 is not disposed, and the light absorbing particles 320b may be disposed only in the region where the first electrode 210 is disposed.

Accordingly, it is possible to increase transmittance of light in the second mode, that is, the open mode. That is, referring to FIG. 19, in the region where the first electrode is disposed in the open mode, a part of the light incident on the first substrate 110 and emitted toward the second substrate 120 may be blocked by a light blocking material such as the light absorbing particles aggregated at one end of the accommodation part 320, but referring to FIG. 20, in the region where the first electrode is not disposed in the open mode, most of the light incident on the first substrate 110 and emitted toward the second substrate 120 may be emitted toward the second electrode without passing through the light blocking material such as separate light absorbing particles.

Therefore, in the optical path control member according to the embodiment, a region where the light blocking material such as the light absorbing particles is not disposed is formed inside the accommodation part by patterning the first electrode, thereby improving the front brightness by increasing the transmittance of light transmitted in the second mode, that is, the open mode compared with forming the first electrode as the surface electrode.

Therefore, it is possible to improve the visibility of the user in a direction of the second substrate in the open mode by improving the front brightness.

Hereinafter, a second embodiment in which the first electrode is formed as the surface electrode and the light conversion unit includes first and second pattern layers will be described with reference to FIGS. 21 to 36.

Figure 21:
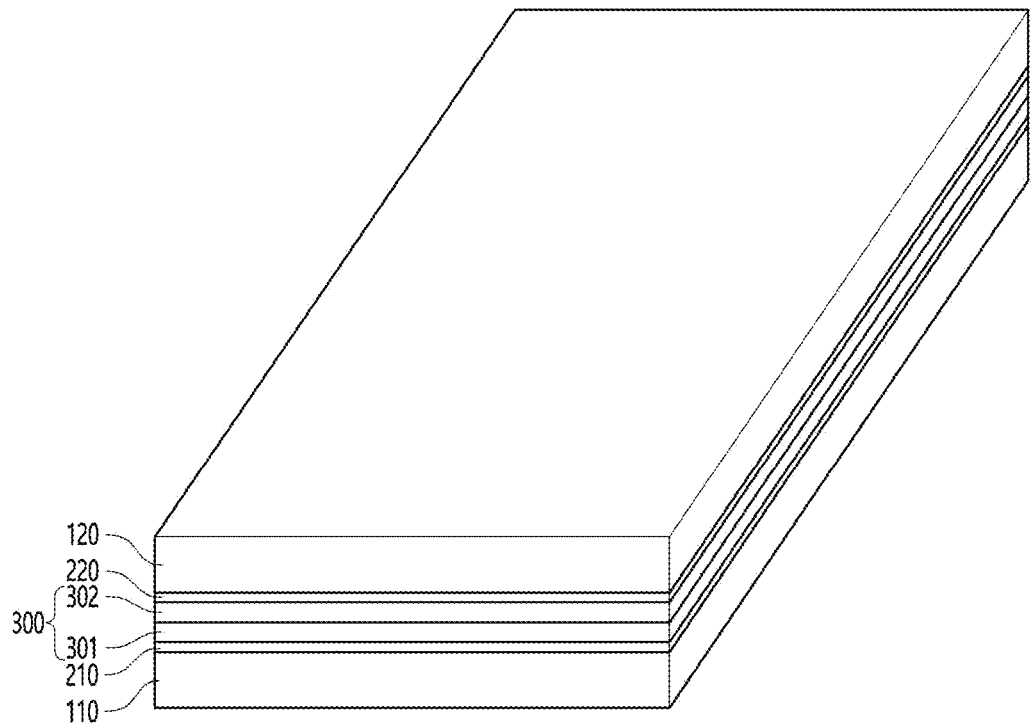
FIG. 21 is a perspective view of an optical path control member according to a second embodiment.

Referring to FIG. 21, the light conversion unit 300 may include a first pattern layer 301 and a second pattern layer 302.

In detail, the light conversion unit 300 may include the first pattern layer 301 disposed on the first electrode 210 and the second pattern layer 302 disposed on the first pattern layer 301.

Figure 22:
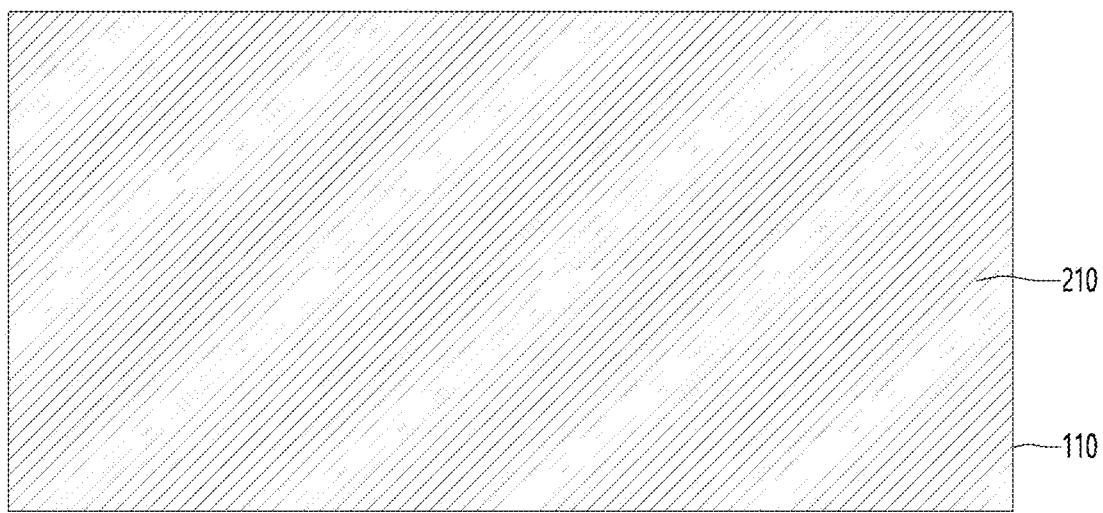
FIG. 22 is a top view showing the arrangement of a first electrode disposed on a first substrate of the optical path control member according to the second embodiment.

In addition, referring to FIG. 22, in the second embodiment, the first electrode 210 disposed on the first substrate 110 may be formed in a film shape, that is, the surface electrode. That is, unlike the first embodiment described above, the first electrode 210 of the second embodiment is not patterned and may be disposed as the surface electrode.

FIGS. 23 to 26 are top views and cross-sectional views of the first pattern layer 301 and the second pattern layer 302.

Figure 23:
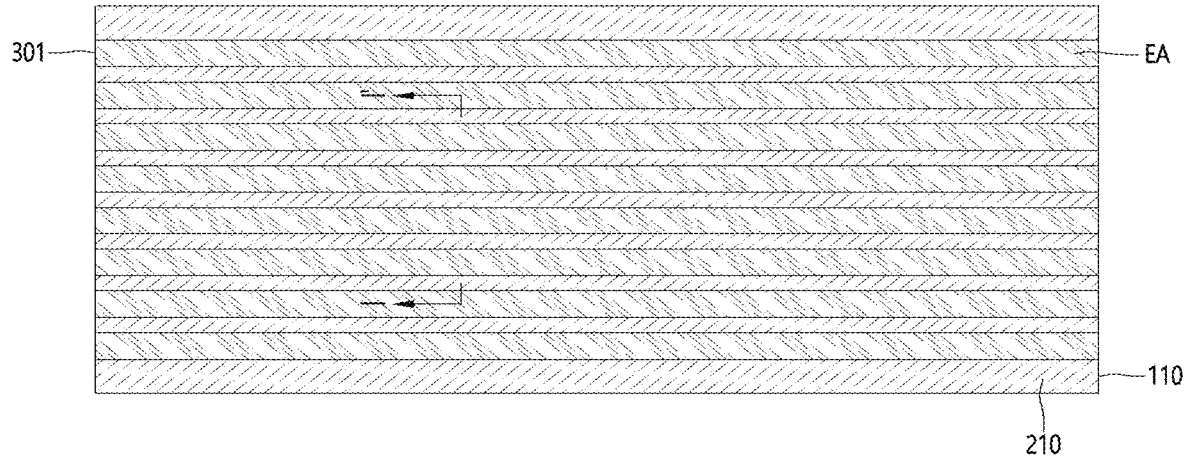
FIG. 23 is a top view showing the arrangement of a first pattern layer of the optical path control member according to the second embodiment.
Figure 24:
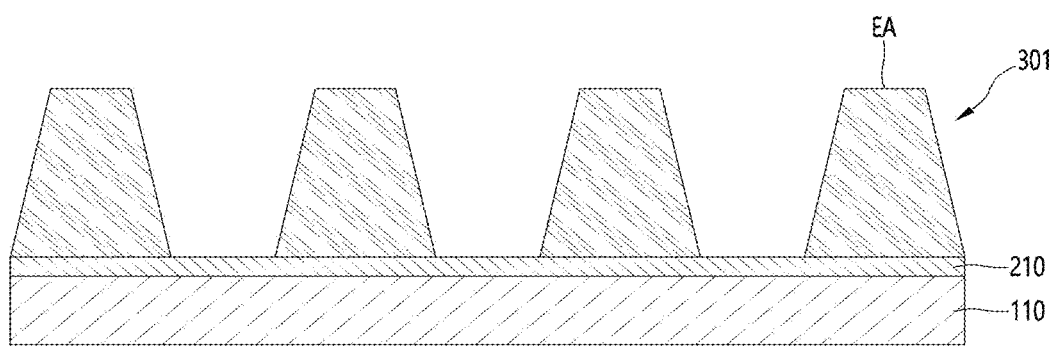
FIG. 24 is a cross-sectional view taken along line I-I' of FIG. 23.

Referring to FIGS. 23 and 24, the first pattern layer 301 may be disposed on the first electrode 210 disposed on the first substrate 110.

The first pattern layer 301 may include embossed portions EA. In detail, the first pattern layer 301 may include a plurality of embossed portions EA disposed to extend in one direction. In detail, the first pattern layer 301 may include a plurality of embossed portions EA that are disposed to extend in a third direction and are spaced apart from each other.

Figure 25:
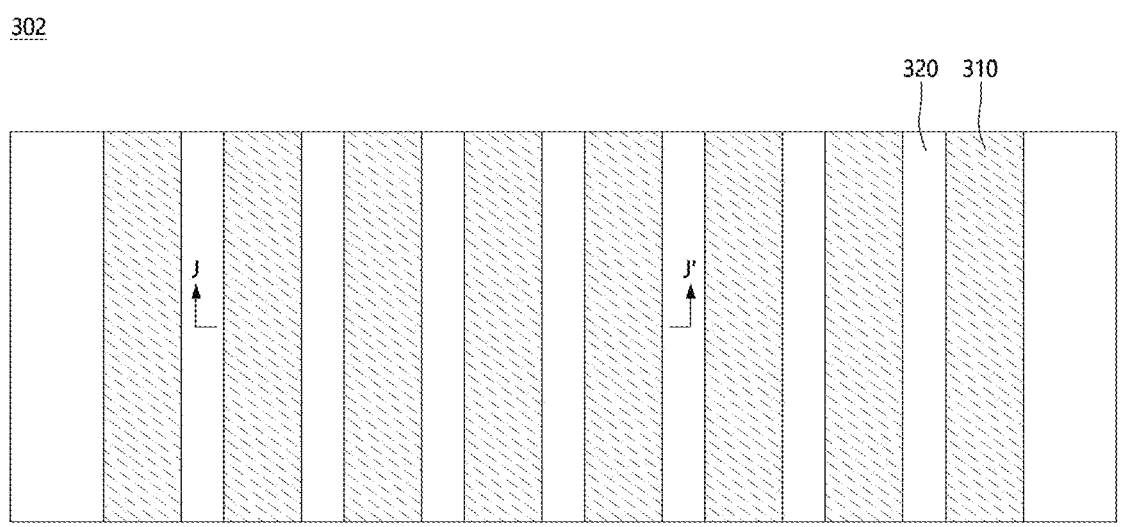
FIG. 25 is a top view showing the arrangement of a second pattern layer of the optical path control member according to the second embodiment.
Figure 26:
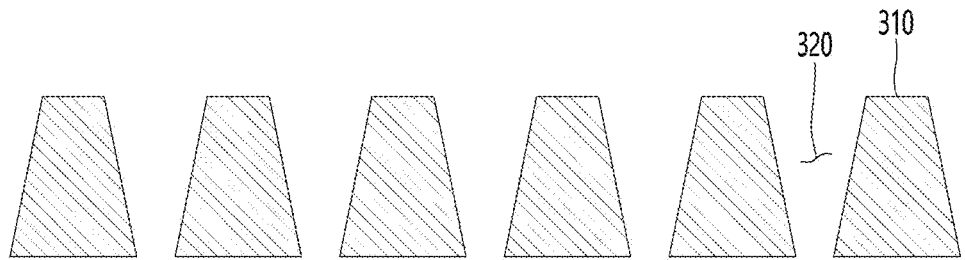
FIG. 26 is a cross-sectional view taken along line J-J' of FIG. 25.

In addition, referring to FIGS. 25 and 26, the second pattern layer 302 may be disposed on the first pattern layer 301. The second pattern layer 302 may correspond to the light conversion unit 300 described above. In detail, the second pattern layer 302 may include the barrier part 310 and the accommodation part 320.

Referring to FIG. 26, the barrier part 310 may be formed to be embossed, and the accommodation part 320 may be formed to be engraved in order to fill the electrolyte 320a and the light absorbing particles 320b in the accommodation part 320. For example, the accommodation part 320 may be defined as a hole or a groove formed in a resin layer forming the second pattern layer 302.

Referring to FIG. 25, the barrier part 310 may be disposed to extend in one direction. In detail, the barrier part 310 formed to be embossed may be disposed to extend in one direction. In detail, the barrier part 310 may be disposed to extend in a fourth direction.

The third direction that is an extension direction of the embossed portion EA of the first pattern layer 301 and the fourth direction that is an extension direction of the barrier part 310 of the second pattern layer 302 may be different directions.

In detail, the fourth direction may be inclined at an angle of about 10° or more with respect to the third direction. In more detail, the fourth direction may be inclined at an angle of 10° to 170° with respect to the third direction.

That is, the barrier part 310 may be inclined and extended at an angle of 10° to 170° with respect to the embossed portion EA of the first pattern layer 301. Accordingly, the embossed portion EA and the barrier part 310 may be formed to partially cross each other.

Figure 27:
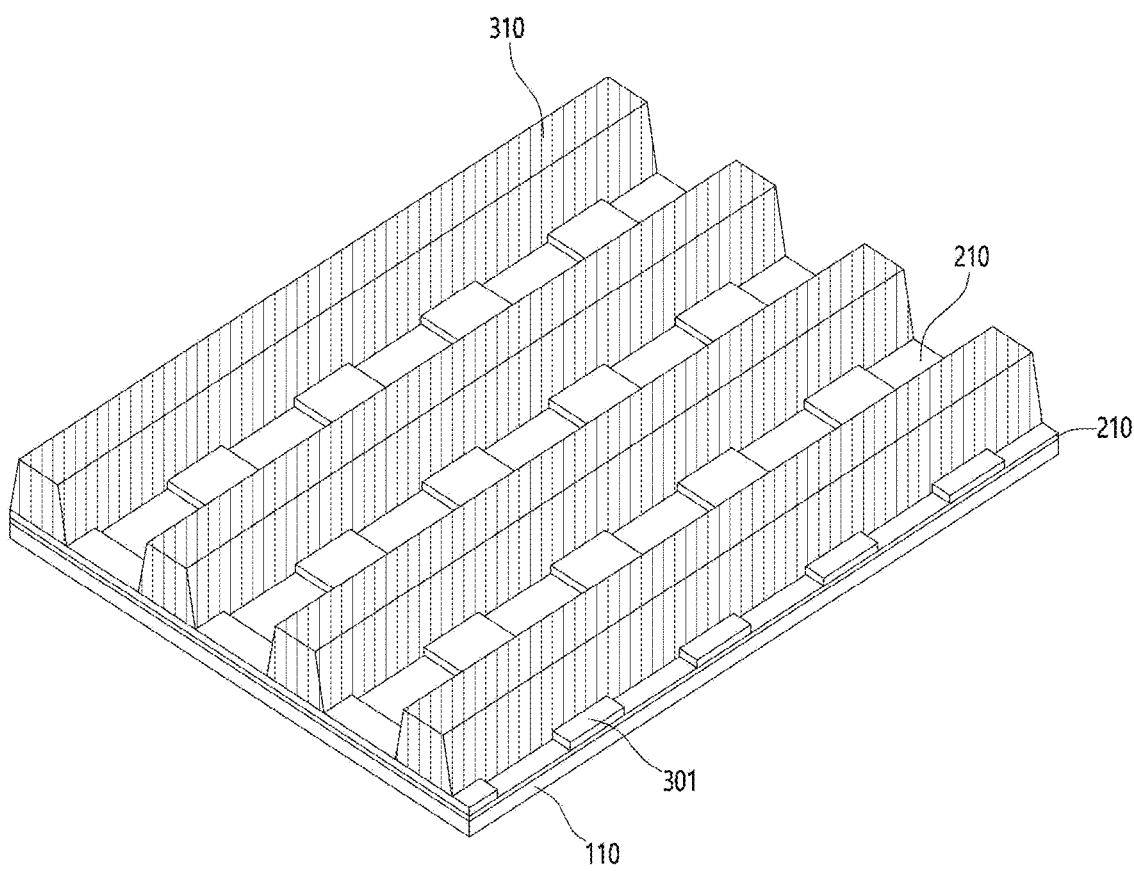
FIG. 27 is a perspective view in which a first substrate and a first electrode overlap and a first pattern layer and a second pattern layer overlap in the optical path control member according to the second embodiment overlap.
Figure 28:
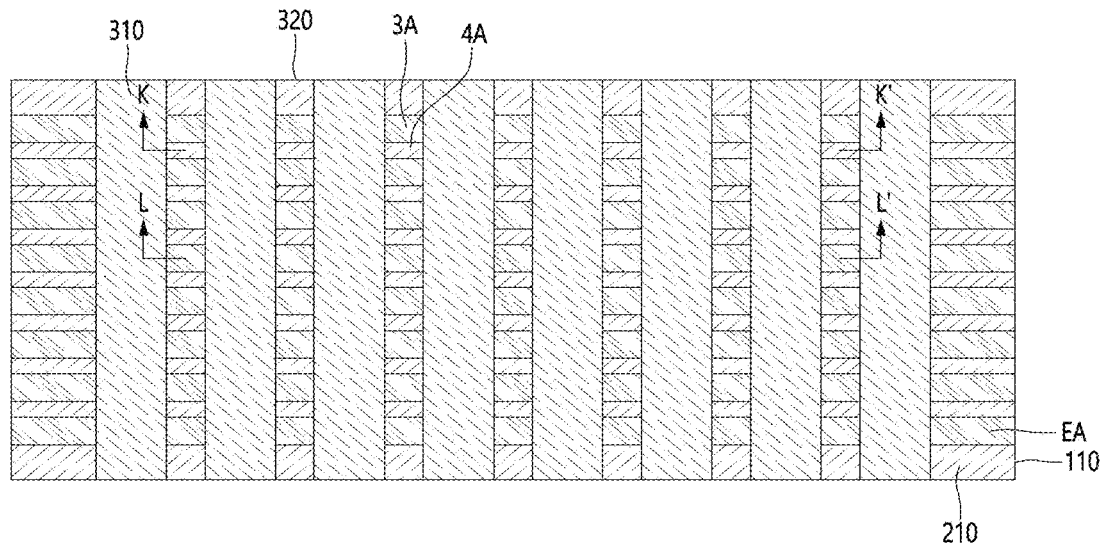
FIG. 28 is a top view in which a first substrate and a first electrode overlap and a first pattern layer and a second pattern layer overlap in the optical path control member according to the second embodiment overlap.

FIG. 27 is a perspective view in which the first pattern layer 301 on which the embossed portion EA is formed overlaps the second pattern layer 302, and FIG. 28 is a top view in which the first pattern layer 301 on which the embossed portion EA described above is formed overlaps the second pattern layer 302. FIGS. 27 and 28 are views showing an example in which the embossed portion EA and the barrier part 310 are inclined and extended at an angle of about 90°.

Referring to FIGS. 27 and 28, the pattern electrodes 211 of the first electrode may be disposed to extend in the third direction, and the barrier part 310 may be extended in the fourth direction inclined at an angle of 90° with respect to the third direction.

Accordingly, the accommodation part 320 between the barrier parts 310 may include a third region 3A in which the embossed portion EA is disposed and a fourth region 4A in which the embossed portion EA is not disposed.

That is, the third region 3A in which the embossed portion EA is disposed and the fourth region 4A in which the embossed portion EA is not disposed may be alternately formed in the accommodation part 320.

Figure 29:
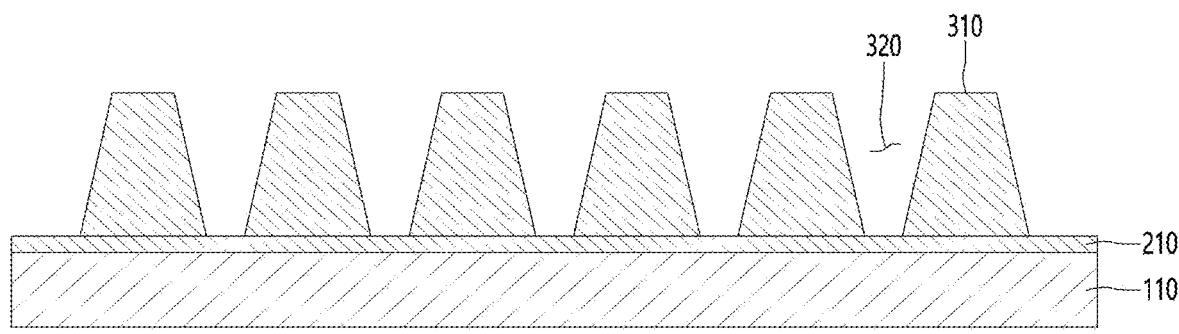
FIG. 29 is a cross-sectional view taken along line K-K' of FIG. 28.
Figure 30:
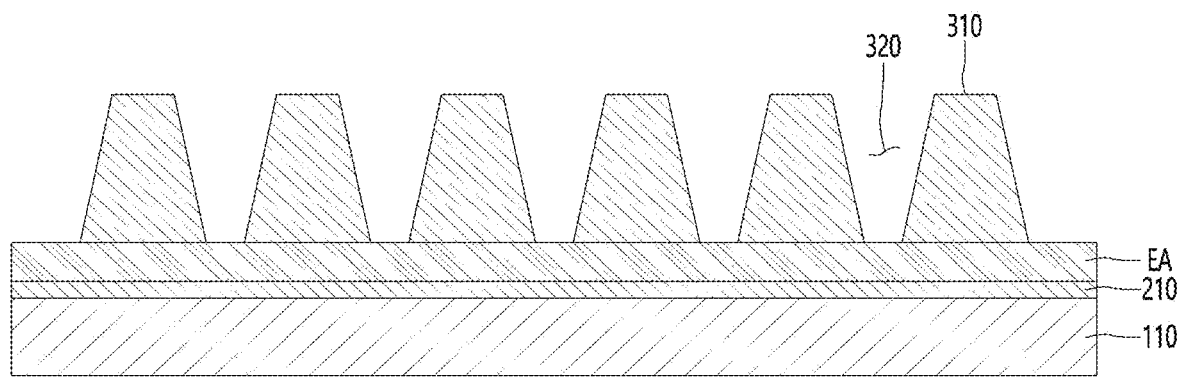
FIG. 30 is a cross-sectional view taken along line L-L' of FIG. 28.

FIGS. 29 and 30 are cross-sectional views taken along lines K-K' and L-L' of FIG. 28, respectively.

Referring to FIG. 29, the first electrode 210 may be disposed under the accommodation part 320. That is, the accommodation part 320 may be in contact with the first electrode 210.

In addition, referring to FIG. 30, the first electrode may not be disposed under the accommodation part 320. That is, the accommodation part 320 may not be in contact with the first electrode 210.

In detail, referring to FIG. 30, the embossed portions EA of the first pattern layer 301 are disposed between the first electrode 210 and the accommodation part 320, so that the accommodation part 320 and the first electrodes 210 may not be in contact with each other.

That is, one accommodation part 320 may include both a region in contact with the first electrode 210 and a region not in contact with the first electrode 210.

Figure 31:
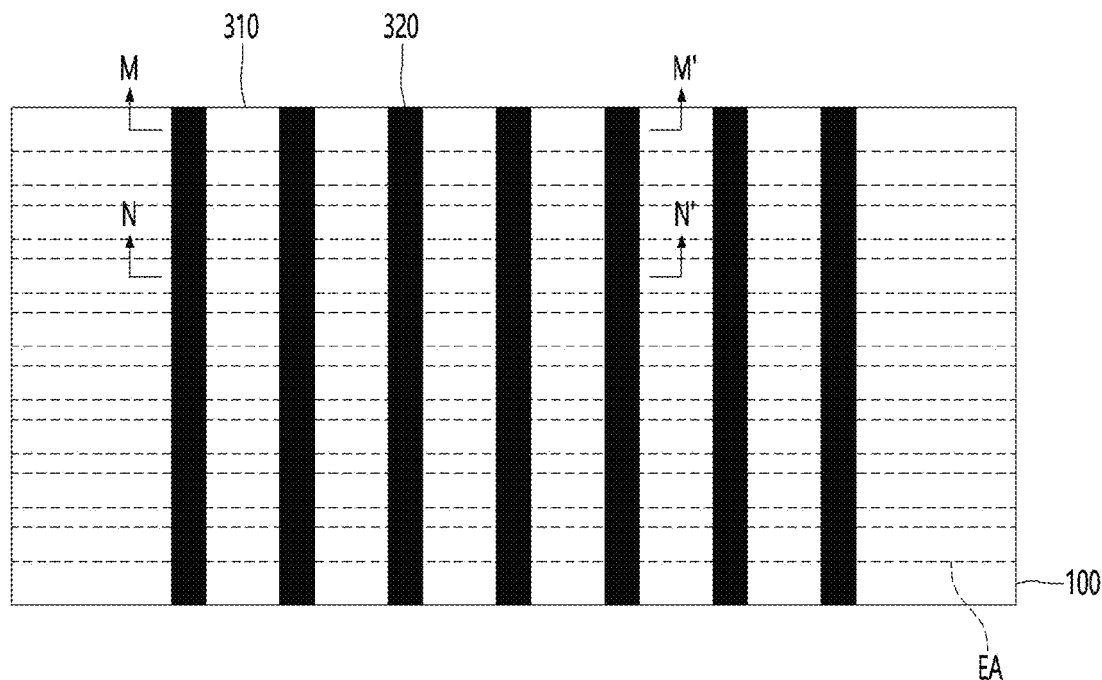
FIGS. 31 and 32 are top views according to whether a voltage is applied to the optical path control member in the second embodiment.
Figure 32:
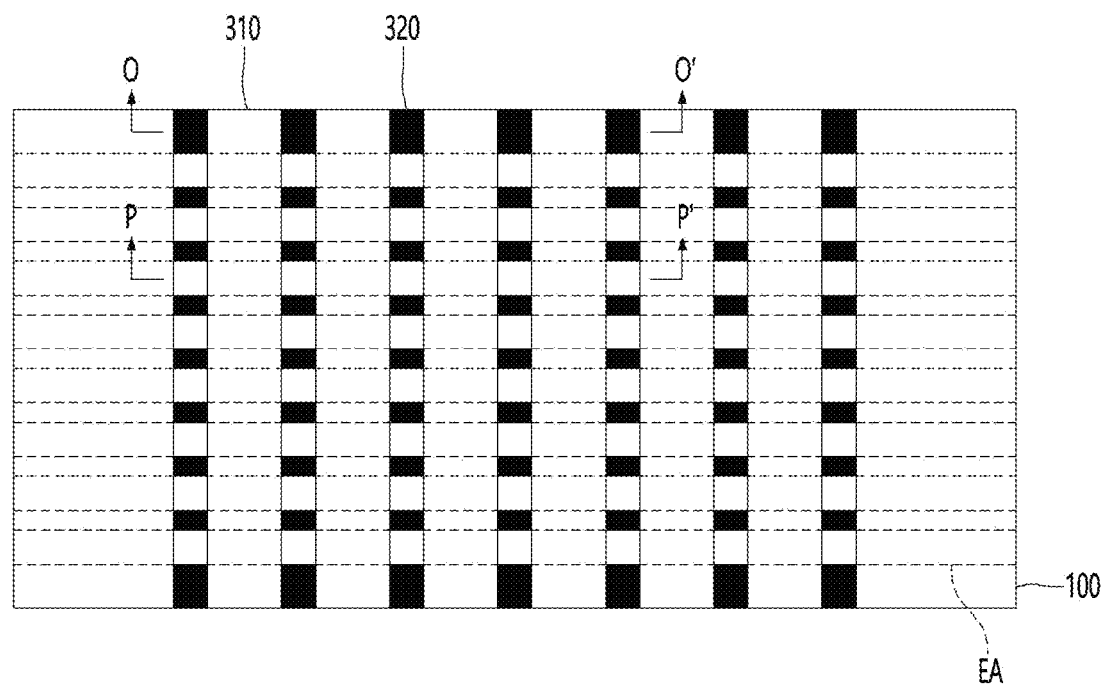

FIGS. 31 and 32 are top views according to whether a voltage is applied to the optical path control member according to the embodiment, and FIGS. 33 to 36 are cross-sectional views taken along line M-M' of FIG. 31, line N-N' of FIG. 31, line O-O' of FIG. 32, and line P-P' of FIG. 32, respectively.

Figure 33:
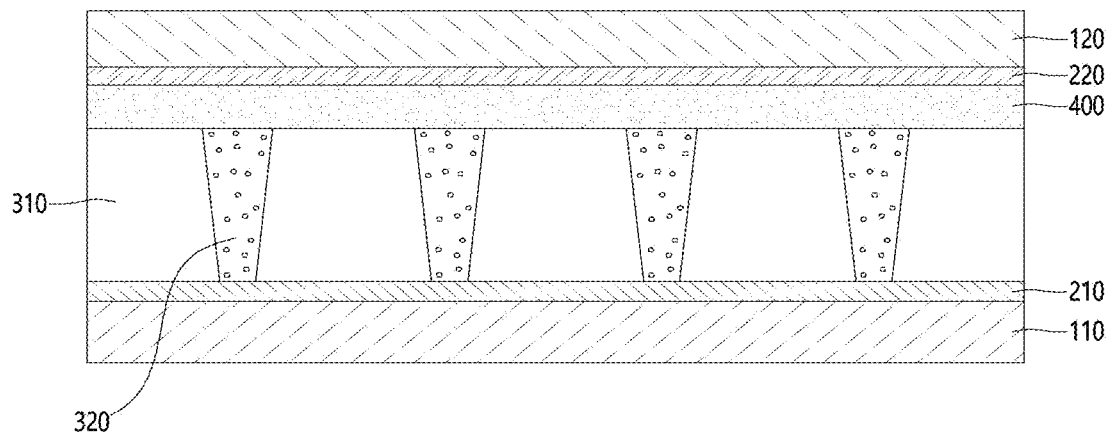
FIG. 33 is a cross-sectional view taken along line M-M' of FIG. 31.
Figure 34:
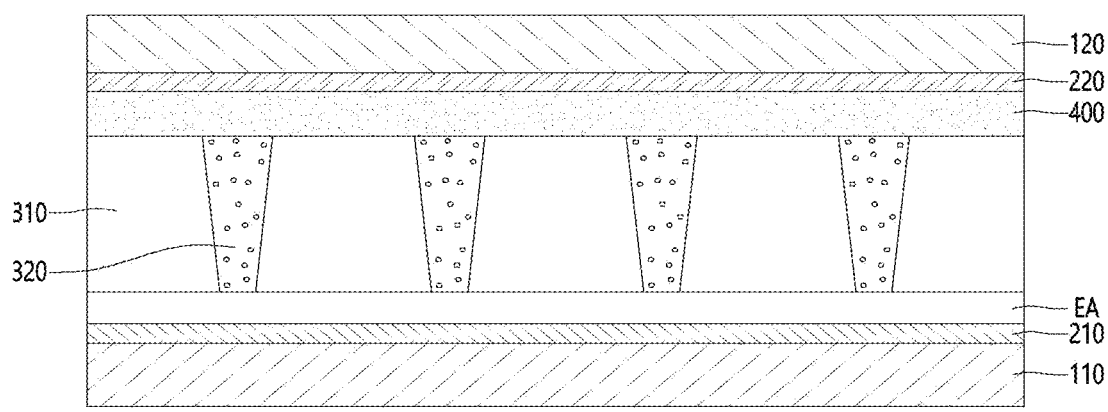
FIG. 34 is a cross-sectional view taken along line N-N' of FIG. 31.

FIGS. 31, 33, and 34 are views showing the first mode in which a voltage is not applied to the optical path control member, that is, a light blocking mode, and as described above, when a voltage is not applied to the optical path control member, the accommodation part 320 may act as a light blocking part. That is, the light absorbing particles 320b inside the electrolyte 320a are uniformly dispersed in the accommodation part 320, so that the accommodation part may act as the light blocking part that blocks light.

Referring to FIGS. 33 and 34, in the first mode in which the voltage is not applied to the optical path control member, that is, in the light blocking mode, the electrolyte and the light absorbing particles may be uniformly dispersed in both the region where the accommodation part 320 overlaps the embossed portion EA and the region where the accommodation part 320 does not overlap the embossed portion EA to fill the accommodation part 320.

Accordingly, as shown in FIG. 31, light incident on the first substrate 110 and emitted toward the second substrate 120 may be partially blocked by the accommodation part 320.

Figure 35:
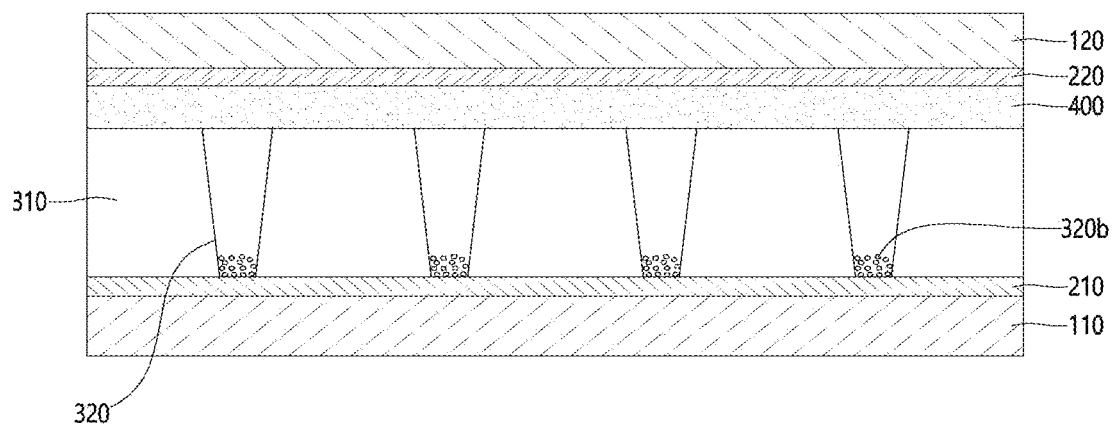
FIG. 35 is a cross-sectional view taken along line O-O' of FIG. 32.
Figure 36:
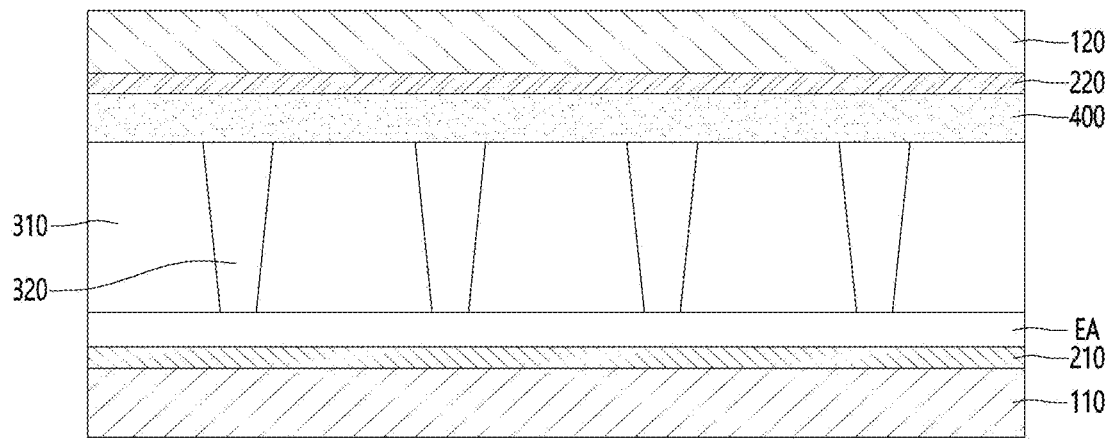
FIG. 36 is a cross-sectional view taken along line P-P' of FIG. 32.

FIGS. 32, 35, and 36 are views showing the second mode in which a voltage is applied to the optical path control member, that is, an open mode, and as described above, when the voltage is applied to the optical path control member, the accommodation part 320 may act as the light transmitting part. That is, in the accommodation part 320, the light absorbing particles 320b inside the electrolyte 320a are aggregated into one end region of the accommodation part 320, and the accommodation part 320 may act as the light transmitting part that transmits light.

Meanwhile, referring to FIG. 32, the light absorbing particles may be aggregated only in a region where the first electrode 210 is disposed inside the accommodation part 320. That is, the light absorbing particles 320b may be aggregated only in a region where the embossed portion EA to which the voltage is applied is not disposed.

That is, referring to FIGS. 35 and 36, the light absorbing particles 320b may be not disposed in a region where the embossed portion EA is disposed, and the light absorbing particles 320b may be disposed only in the region where the embossed portion EA is not disposed.

Accordingly, it is possible to increase transmittance of light in the second mode, that is, the open mode. That is, referring to FIG. 35, in the region where the embossed portion EA is not disposed in the open mode, a part of the light incident on the first substrate 110 and emitted toward the second substrate 120 may be blocked by a light blocking material such as the light absorbing particles aggregated at one end of the accommodation part 320, but referring to FIG. 36, in the region where the embossed portion EA is disposed in the open mode, most of the light incident on the first substrate 110 and emitted toward the second substrate 120 may be emitted toward the second electrode without passing through the light blocking material such as separate light absorbing particles.

Therefore, in the optical path control member according to the embodiment, a region where the light blocking material such as the light absorbing particles is not disposed is formed inside the accommodation part by patterning the first and second pattern layers, thereby improving the front brightness by increasing the transmittance of light transmitted in the second mode, that is, the open mode.

Therefore, it is possible to improve the visibility of the user in the direction of the second substrate in the open mode by improving the front brightness.

Meanwhile, the first electrode of the optical path control member according to the second embodiment may be formed in a pattern shape other than the surface electrode.

In detail, the first electrode may be formed in the same pattern shape as the accommodation part. That is, the first electrode may be patterned so as to overlap the accommodation part. That is, the first electrode may be patterned so that the first electrode is not formed in a region overlapping the embossed portion but is only formed in a region overlapping the accommodation part.

Hereinafter, a method of manufacturing an optical path control member according to an embodiment will be described with reference to FIGS. 37 to 44.

Figure 37:
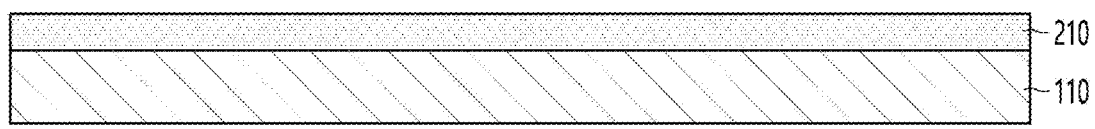
FIGS. 37 to 44 are views for describing a method of manufacturing an optical path control member according to an embodiment.

First, referring to FIG. 37, an electrode material forming a first substrate 110 and a first electrode is prepared. Subsequently, the electrode material may be formed on one surface of the first substrate 110 by a coating or deposition process. In detail, the electrode material may be formed on the entire surface of the first substrate 110. Accordingly, a first electrode 210 formed as a surface electrode may be formed on the first substrate 110.

Figure 38:
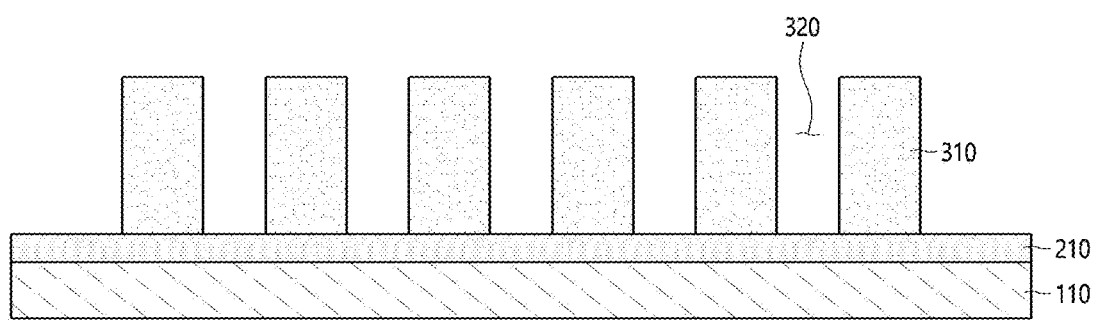

Subsequently, referring to FIG. 38, a resin layer may be formed by applying a resin material on the first electrode 210. In detail, the resin layer may be formed by applying a urethane resin or an acrylic resin on the first electrode 210.

Subsequently, a pattern part may be formed on the resin layer using a mold. In detail, holes or grooves are formed in the resin layer by imprinting the mold, and accordingly, a barrier part may be formed by the remaining resin layer. That is, the barrier part 310 and the accommodation part 320 described above may be formed on the resin layer.

Figure 39:
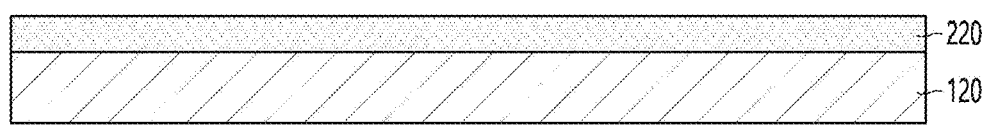

Subsequently, referring to FIG. 39, an electrode material forming a second substrate 120 and a second electrode is prepared. Subsequently, the electrode material may be formed on one surface of the second substrate 120 by a coating or deposition process. In detail, the electrode material may be formed on the entire surface of the second substrate 120. Accordingly, a second electrode 220 formed as a surface electrode may be formed on the second substrate 120.

Figure 40:
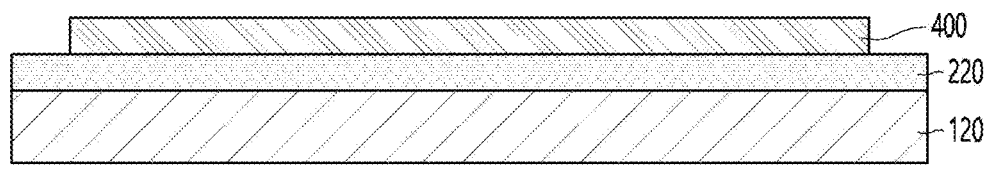

Subsequently, referring to FIG. 40, an adhesive layer 400 may be formed by applying an adhesive material on the second electrode 220. The adhesive layer 400 may be formed on a partial region of the second electrode 220.

Figure 41A:
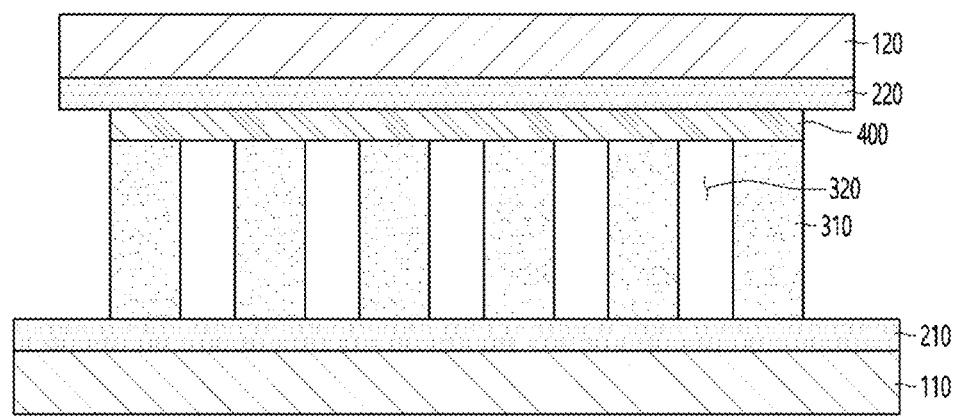
Figure 41B:
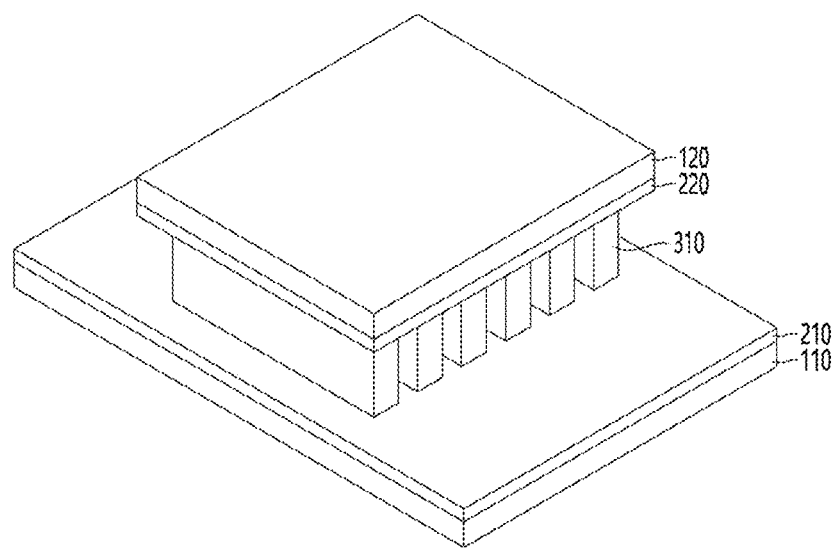

Subsequently, referring to FIGS. 41(a) and 41(b), the first substrate 110 and the second substrate 120 manufactured in advance may be adhered. In detail, the first substrate 110 and the second substrate 120 may be adhered to each other through the adhesive layer 400 on the second substrate 120.

In this case, the first substrate 110 and the second substrate 120 may be adhered in different directions. In detail, the first substrate 110 and the second substrate 120 may be adhered to each other so that a long side direction of the first substrate 110 and a short side direction of the second substrate 120 overlap each other.

Accordingly, first and second connection electrodes connected to an external printed circuit board may be formed on surfaces exposed from the first substrate 110 and the second substrate 120.

Figure 42:
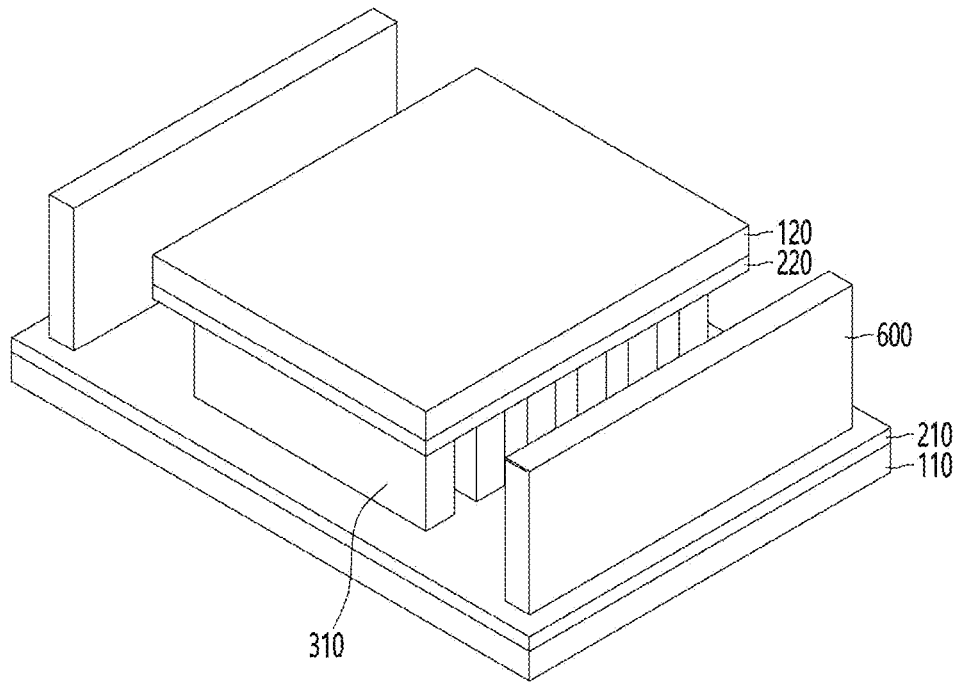

Subsequently, referring to FIG. 42, a dam part 600 may be formed on the first substrate 110. In detail, the dam part 600 may be disposed above and below the accommodation part 320 disposed on the first substrate 110. That is, the dam part 600 may be disposed so that the accommodation part 320 is disposed between the dam parts 600.

Figure 43:
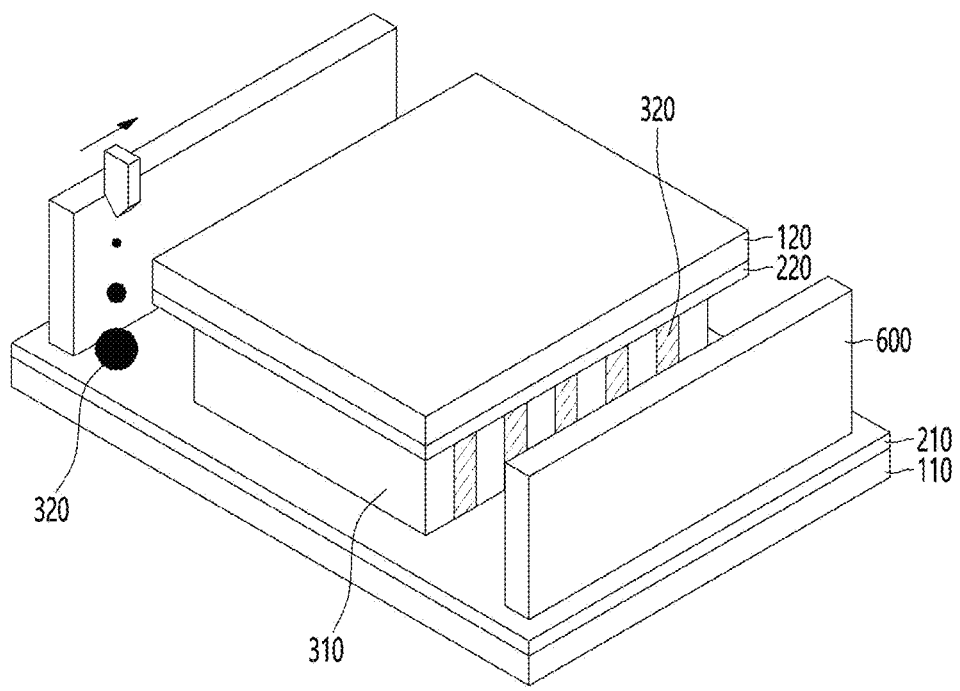

Subsequently, referring to FIG. 43, a light conversion material may be injected between the accommodation part 320, that is, the barrier parts 310. In detail, a light conversion material in which light absorbing particles such as carbon black or the like are dispersed in an electrolyte solvent containing a paraffinic solvent may be injected between the accommodation part 320, that is, between the barrier parts. Accordingly, the barrier part 310 described above may be formed between the accommodation parts 320.

Figure 44:
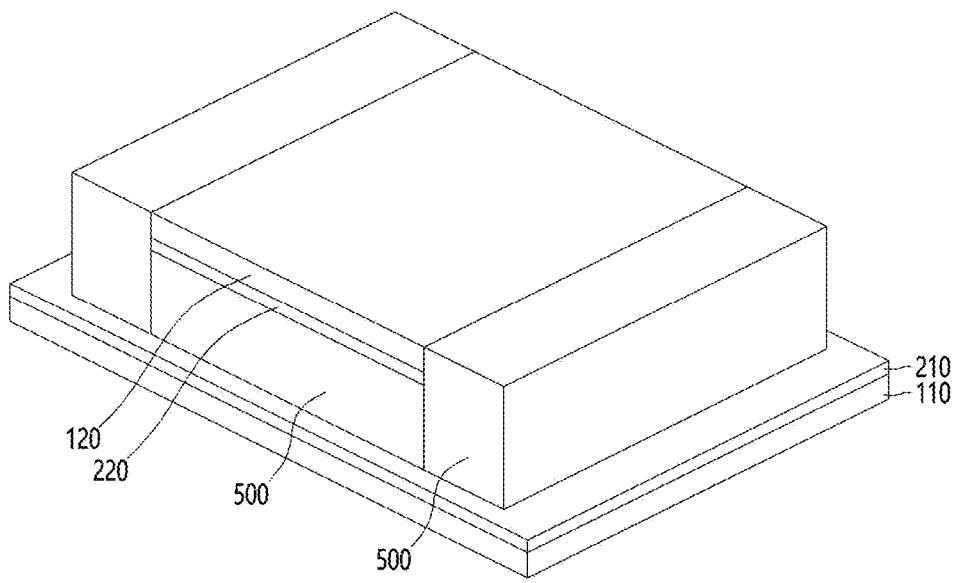

Subsequently, referring to FIG. 44, the light conversion material inside the accommodation part may be sealed from the outside by forming a sealing part 500 in the lateral direction of the accommodation part 320. Subsequently, a final optical path control member may be formed by cutting the first substrate 110.

Hereinafter, referring to FIGS. 45 to 47, a display device and a display apparatus to which an optical path control member according to an embodiment is applied will be described.

Figure 45:
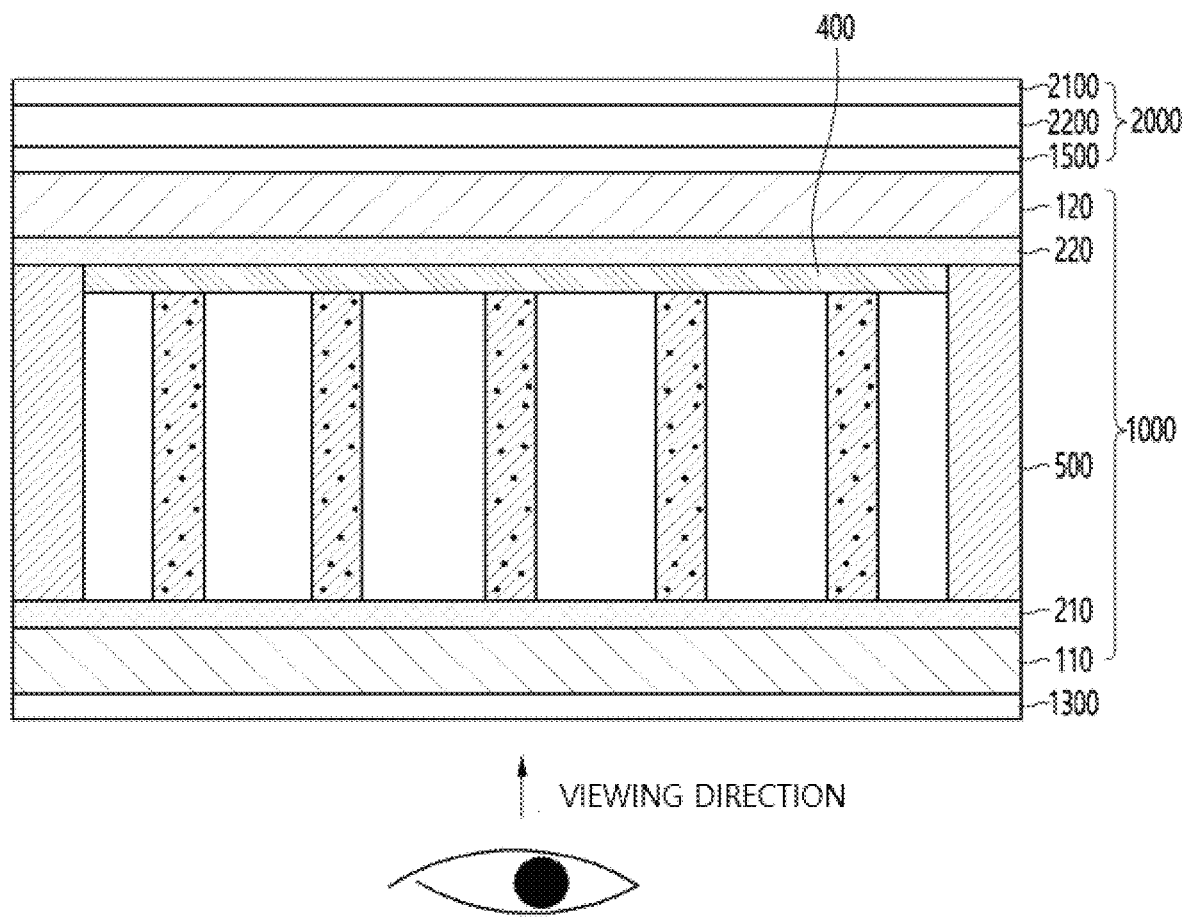
FIG. 45 is a cross-sectional view of a display device to which an optical path control member according to an embodiment is applied.

Referring to FIG. 45, an optical path control member 1000 according to an embodiment may be disposed on a display panel 2000.

The display panel 2000 and the optical path control member 1000 may be disposed to be adhered to each other. For example, the display panel 2000 and the optical path control member 1000 may be adhered to each other via an adhesive layer 1500. The adhesive layer 1500 may be transparent. For example, the adhesive layer 1500 may include an adhesive or an adhesive layer containing an optical transparent adhesive material.

The adhesive layer 1500 may include a release film. In detail, when adhering the optical path control member and the display panel, the optical path control member and the display panel may be adhered after the release film is removed.

The display panel 2000 may include a first' substrate 2100 and a second' substrate 2200. When the display panel 2000 is a liquid crystal display panel, the display panel 2000 may be formed in a structure in which the first' substrate 2100 including a thin film transistor (TFT) and a pixel electrode and the second' substrate 2200 including color filter layers are bonded with a liquid crystal layer interposed therebetween.

In addition, the display panel 2000 may be a liquid crystal display panel of a color filter on transistor (COT) structure in which a thin film transistor, a color filter, and a black matrix are formed at the first' substrate 2100 and the second' substrate 2200 is bonded to the first' substrate 2100 with the liquid crystal layer interposed therebetween. That is, a thin film transistor may be formed on the first' substrate 2100, a protective film may be formed on the thin film transistor, and a color filter layer may be formed on the protective film. In addition, a pixel electrode in contact with the thin film transistor may be formed on the first' substrate 2100. At this point, in order to improve an aperture ratio and simplify a masking process, the black matrix may be omitted, and a common electrode may be formed to function as the black matrix.

In addition, when the display panel 2000 is the liquid crystal display panel, the display device may further include a backlight unit providing light from a rear surface of the display panel 2000.

That is, when the display panel 2000 includes the liquid crystal display panel, the optical path control member may be disposed between the backlight unit and the liquid crystal display panel.

Alternatively, when the display panel 2000 is an organic electroluminescence display panel, the display panel 2000 may include a self-luminous element that does not require a separate light source. In the display panel 2000, a thin film transistor may be formed on the first[1] substrate 2100, and an organic light emitting element in contact with the thin film transistor may be formed. The organic light emitting element may include an anode, a cathode, and an organic light emitting layer formed between the anode and the cathode. Further, the second' substrate 2200 configured to function as an encapsulation substrate for encapsulation may further be included on the organic light emitting element.

Furthermore, although not shown in drawings, a polarizing plate may be further disposed between the optical path control member 1000 and the display panel 2000. The polarizing plate may be a linear polarizing plate or an external light reflection preventive polarizing plate. For example, when the display panel 2000 is a liquid crystal display panel, the polarizing plate may be the linear polarizing plate. Further, when the display panel 2000 is the organic electroluminescence display panel, the polarizing plate may be the external light reflection preventive polarizing plate.

In addition, an additional functional layer 1300 such as an anti-reflection layer, an anti-glare, or the like may be further disposed on the optical path control member 1000. Specifically, the functional layer 1300 may be adhered to one surface of the first substrate 110 of the optical path control member. Although not shown in drawings, the functional layer 1300 may be adhered to the first substrate 110 of the optical path control member via an adhesive layer. In addition, a release film for protecting the functional layer may be further disposed on the functional layer 1300.

Further, a touch panel may be further disposed between the display panel and the optical path control member.

Although it is shown in the drawings that the optical path control member is disposed at an upper portion of the display panel, but the embodiment is not limited thereto, and the optical path control member may be disposed at various positions such as a position in which light is adjustable, that is, a lower portion of the display panel, between a second substrate and a first substrate of the display panel, or the like.

Figure 46:
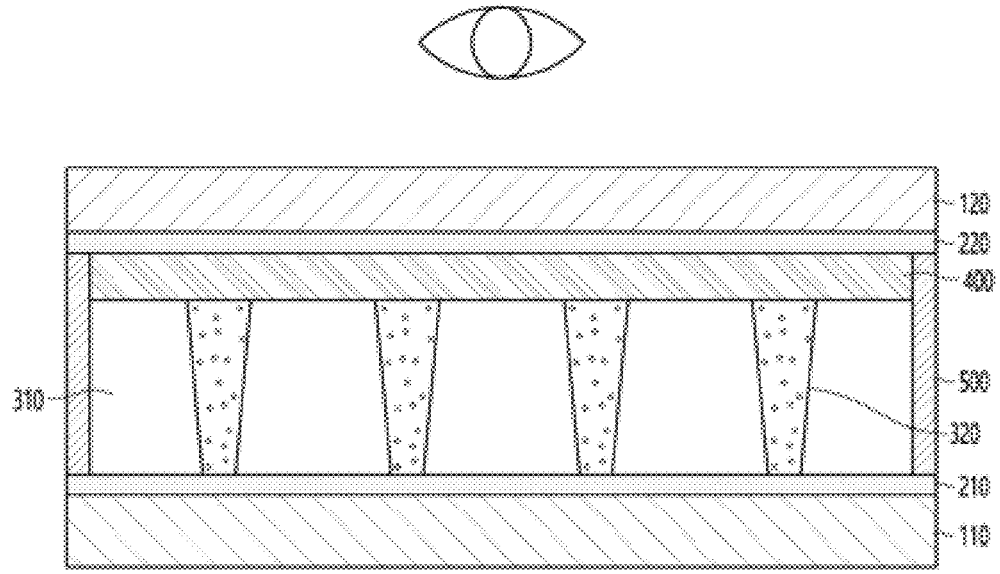
FIGS. 46 and 47 are views for describing one embodiment of the display device to which the optical path control member according to the embodiment is applied.
Figure 46:
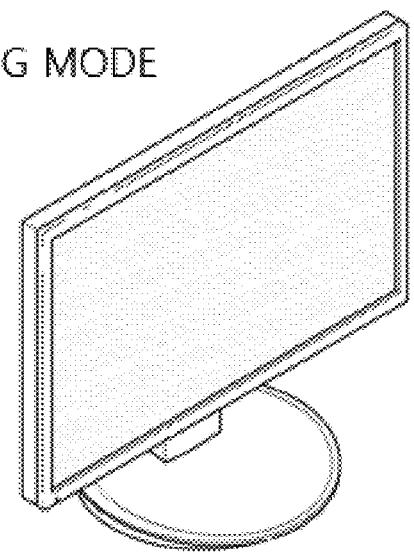
Figure 47:
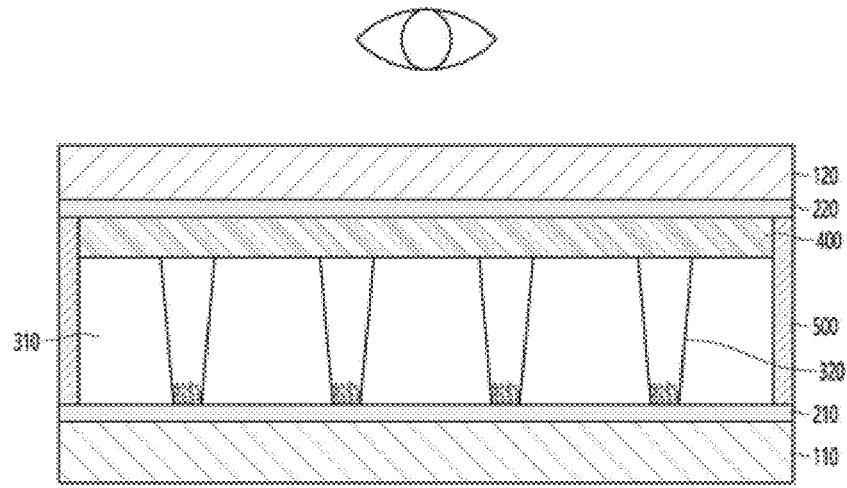
Figure 47:
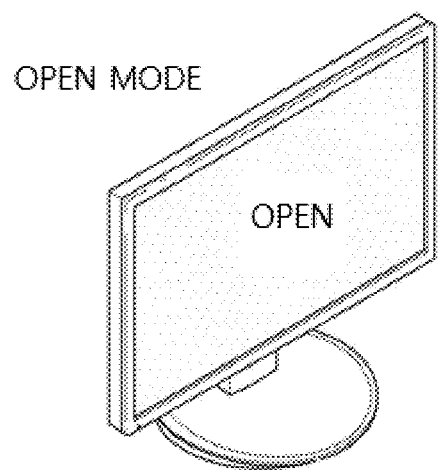

Referring to FIGS. 46 and 47, an optical path control member according to an embodiment may be applied to a display device that displays a display.

For example, when power is not applied to the optical path control member as shown in FIG. 46, the accommodation part functions as the light blocking part, so that the display device is driven in a light blocking mode, and when power is applied to the optical path control member as shown in FIG. 47, the accommodation part functions as the light transmitting part, so that the display device may be driven in an open mode.

Accordingly, a user may easily drive the display device in a privacy mode or a normal mode according to application of power.

In addition, although not shown in the drawings, the display device to which the optical path control member according to the embodiment is applied may also be applied inside a vehicle.

For example, the display device including the optical path control member according to the embodiment may display a video confirming information of the vehicle and a movement route of the vehicle. The display device may be disposed between a driver seat and a passenger seat of the vehicle.

In addition, the optical path control member according to the embodiment may be applied to a dashboard that displays a speed, an engine, an alarm signal, and the like of the vehicle.

Furthermore, the optical path control member according to the embodiment may be applied to a front glass (FG) of the vehicle or right and left window glasses.

The characteristics, structures, effects, and the like described in the above-described embodiments are included in at least one embodiment of the present invention, but are not limited to only one embodiment. Furthermore, the characteristic, structure, and effect illustrated in each embodiment may be combined or modified for other embodiments by a person skilled in the art. Accordingly, it is to be understood that such combination and modification are included in the scope of the present invention.

In addition, embodiments are mostly described above, but the embodiments are merely examples and do not limit the present invention, and a person skilled in the art may appreciate that several variations and applications not presented above may be made without departing from the essential characteristic of embodiments. For example, each component specifically represented in the embodiments may be varied. In addition, it should be construed that differences related to such a variation and such an application are included in the scope of the present invention defined in the following claims.

The invention claimed is:

1. An optical path control member comprising:
a first substrate;
a first electrode disposed on the first substrate;
a second substrate disposed on the first substrate;
a second electrode disposed under the second substrate; and
a light conversion unit disposed between the first electrode and the second electrode,
wherein the light conversion unit includes a barrier part and an accommodation part alternately disposed,
wherein the accommodation part is configured to change light transmittance according to application of a voltage,
wherein the first electrode includes a plurality of pattern electrodes extending in a first direction and spaced apart from each other,
wherein the barrier part and the accommodation part extend in a second direction different from the first direction,
wherein the accommodation part includes a first region overlapping the first electrode in a thickness direction of the first substrate and a second region not overlapping with the first electrode in the thickness direction,
wherein the accommodation part includes an electrolyte and a plurality of light absorbing particles dispersed in the electrolyte,
wherein a surface of the light absorbing particles is negatively charged,
wherein when the voltage is applied to the first electrode and the second electrode, an electric field is formed between the first electrode and the second electrode, and the light absorbing particles move and are disposed only in the first region,
wherein when the voltage is not applied, the light absorbing particles are disposed in both the first region and the second region, and
wherein a voltage of a same polarity is applied to the plurality of pattern electrodes.

2. The optical path control member of claim 1, wherein the plurality of pattern electrodes and the barrier part are disposed to cross each other.

3. A display device comprising:
a display panel; and
an optical path control member of claim 1 disposed on the display panel.

4. The optical path control member of claim 1, wherein a line width of the pattern electrode is 35 μm to 40 μm,
a separation distance of the pattern electrodes is 25 μm to 30 μm, and
the line width is greater than the separation distance.

5. The optical path control member of claim 1, wherein a width of the accommodation part is widened while the accommodation part extends from a light incident part on which light is incident toward a light emitting part from which the light is emitted.

6. The optical path control member of claim 1, wherein a positive voltage is applied to all of the plurality of pattern electrodes.

7. The optical path control member of claim 6, wherein the first region and the second region are alternately disposed.

8. An optical path control member comprising:
a first substrate;
a first electrode disposed on the first substrate;
a second substrate disposed on the first substrate;
a second electrode disposed under the second substrate; and
a light conversion unit disposed between the first electrode and the second electrode,
wherein the light conversion unit includes a first pattern layer on the first electrode and a second pattern layer on the first pattern layer,
wherein the first pattern layer includes a plurality of embossed portions extending in a third direction,
wherein the second pattern layer includes a barrier part extending in a fourth direction different from the third direction and an accommodation part disposed between the barrier parts to change light transmittance according to application of a voltage, wherein the accommodation part includes a third region overlapping the plurality of embossed portions in a thickness direction and a fourth region that does not overlap the embossed portions in the thickness direction, wherein the accommodation part includes an electrolyte and a plurality of light absorbing particles dispersed in the electrolyte, wherein a surface of the light absorbing particles is negatively charged, wherein when the voltage is applied to the first electrode and the second electrode, an electric field is formed between the first electrode and the second electrode, and the light absorbing particles move and are disposed only in the fourth region, wherein when the voltage is not applied, the light absorbing particles are disposed in both the third region and the fourth region, wherein the first electrode is a surface electrode, and wherein a voltage of a same polarity is applied throughout the surface electrode.

9. The optical path control member of claim 8, wherein the first electrode is exposed in the fourth region.

10. The optical path control member of claim 8, wherein the first pattern layer and the second pattern layer are disposed to cross each other.

11. The optical path control member of claim 8, wherein the first pattern layer and the second pattern layer are in direct contact with each other.

12. The optical path control member of claim 8, wherein the third region and the fourth region are alternately disposed.

13. The optical path control member of claim 8, wherein a width of the accommodation part is widened while the accommodation part extends from a light incident part on which light is incident toward a light emitting part from which the light is emitted.

14. The optical path control member of claim 8, wherein the first pattern layer and the second pattern layer are disposed on the first substrate.

15. The optical path control member of claim 14, wherein the first pattern layer and the second pattern layer are in direct contact with the first electrode.

* * * * *